United States Patent
Wakui

(10) Patent No.: US 12,548,187 B2
(45) Date of Patent: Feb. 10, 2026

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Miki Wakui, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 419 days.

(21) Appl. No.: 18/152,795

(22) Filed: Jan. 11, 2023

(65) Prior Publication Data
US 2023/0230278 A1  Jul. 20, 2023

(30) Foreign Application Priority Data
Jan. 17, 2022  (JP) ................. 2022-004943

(51) Int. Cl.
*G06T 7/73* (2017.01)
*G06T 7/55* (2017.01)
(Continued)

(52) U.S. Cl.
CPC ............ *G06T 7/73* (2017.01); *G06T 7/55* (2017.01); *G06T 15/20* (2013.01); *G06T 17/00* (2013.01);
(Continued)

(58) Field of Classification Search
CPC .. G06T 7/73; G06T 7/55; G06T 15/20; G06T 17/10; G06T 2207/10028; G06T 7/564;
(Continued)

(56) References Cited

U.S. PATENT DOCUMENTS

| | | | |
|---|---|---|---|
| 6,621,921 B1 * | 9/2003 | Matsugu | G06T 7/55 382/154 |
| 2015/0172626 A1 * | 6/2015 | Martini | G06T 7/246 348/50 |

(Continued)

FOREIGN PATENT DOCUMENTS

| | | |
|---|---|---|
| JP | 2003-058911 A | 2/2003 |
| JP | 2018-510324 A | 4/2018 |

(Continued)

OTHER PUBLICATIONS

Raghavendra, R. et al., "3D face reconstruction and multimodal person identification from video captured using smartphone camera" 2013 IEEE International Conference on Technologies for Homeland Security (HST), IEEE (Nov. 2013) pp. 552-557.

(Continued)

*Primary Examiner* — Alicia M Harrington
*Assistant Examiner* — Christine Yera Ahn
(74) *Attorney, Agent, or Firm* — Carter, DeLuca & Farrell LLP

(57) ABSTRACT

Highly accurate three-dimensional shape data is obtained easily. The information processing apparatus obtains data of a plurality of captured images obtained by capturing an object from a plurality of viewpoints different from one another. Further, the information processing apparatus obtains first three-dimensional shape data indicating the shape of the object, which includes information indicating the spatial position of each of a plurality of feature points indicating features of the object. Furthermore, the information processing apparatus obtains second three-dimensional shape data indicating the shape of the object by using the captured image. Here, the information processing apparatus obtains, at the time of obtaining the first three-dimensional shape data, the first three-dimensional shape data, based on (Continued)

reliability of the spatial position of each of the plurality of feature points and the second three-dimensional shape data.

14 Claims, 17 Drawing Sheets

(51) Int. Cl.
    *G06T 15/20*      (2011.01)
    *G06T 17/00*      (2006.01)
    *G06V 10/74*      (2022.01)

(52) U.S. Cl.
    CPC .. *G06V 10/761* (2022.01); *G06T 2207/10028* (2013.01)

(58) Field of Classification Search
    CPC . G06T 2207/10016; G06T 2207/20081; G06T 2207/30201; G06V 10/761
    See application file for complete search history.

(56) References Cited

U.S. PATENT DOCUMENTS

| | | |
|---|---|---|
| 2016/0212411 A1 | 7/2016 | Lindner et al. |
| 2017/0004649 A1* | 1/2017 | Collet Romea ........... G06T 7/33 |
| 2019/0188474 A1* | 6/2019 | Zahnert ............... G06F 3/04815 |
| 2020/0012877 A1* | 1/2020 | Kotake ..................... G06T 7/73 |
| 2020/0257888 A1* | 8/2020 | Ebihara ................ H04N 23/611 |
| 2022/0284672 A1* | 9/2022 | Teranishi ................ G06T 7/579 |

FOREIGN PATENT DOCUMENTS

| | | |
|---|---|---|
| JP | 6849256 B1 | 3/2021 |
| KR | 10-2020-0100020 A | 8/2020 |
| WO | 2017/003673 A1 | 1/2017 |

OTHER PUBLICATIONS

Rouabhia, D. et al., "Combining visual hull and stereovision technique for new 3D reconstruction method" 2011 International Conference Oncommunications, Computing and Control Applications (CCCA), IEEE (Mar. 2011) pp. 1-5.

Dai, P. et al., "Coarse-to-fine multiview 3d face reconstruction using multiple geometrical features" Multimedia Tools and Applications (Jan. 2017) pp. 939-966, vol. 77, No. 1.

EESR EP Patent Application No. 23151730.1, dated Jun. 7, 2023.

Notice of Reasons for Refusal issued by the Japanese Patent Office on Oct. 14, 2025 in corresponding JP Patent Application No. 2022-004943, with English translation.

* cited by examiner

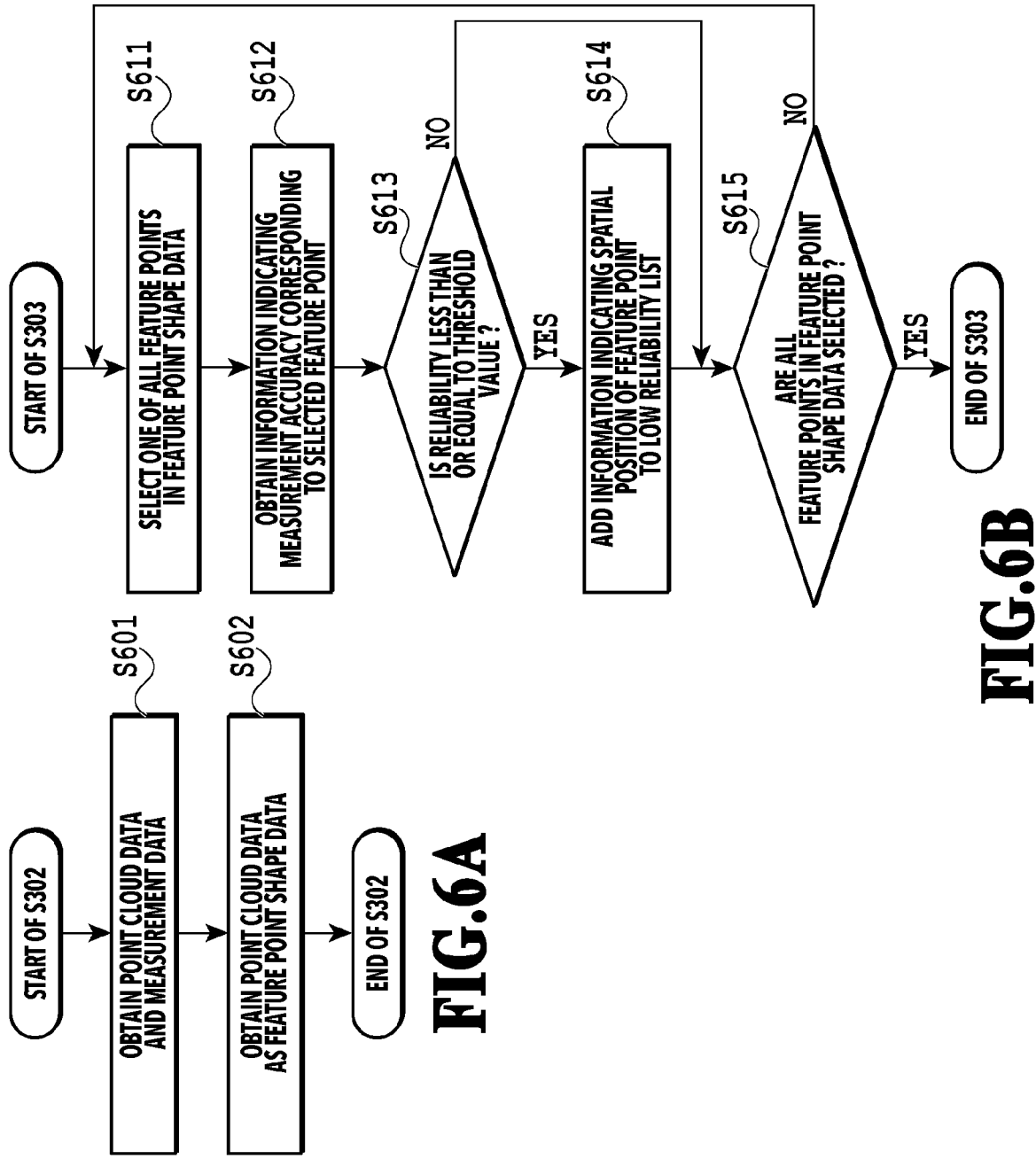

INFORMATION PROCESSING APPARATUS, INFORMATION PROCESSING METHOD, AND STORAGE MEDIUM

BACKGROUND

Field

The present disclosure relates to a technique to generate three-dimensional shape data indicating the shape of an object.

Description of the Related Art

There is a method of obtaining point cloud data as three-dimensional shape data indicating the shape of an object, which is obtained from a contact three-dimensional measuring device that measures the shape of an object by causing a probe to come into contact with the object, a noncontact three-dimensional measuring device that scans the shape of an object by irradiating the object with laser beams, or the like. Further, there is a method of generating three-dimensional shape data indicating the shape of an object by the visual hull method using a plurality of pieces of captured image data obtained by capturing the object from multiple viewpoints. Here, the visual hull method is a method of defining a plurality of cones in which the object is estimated to exist by using each captured image and regarding the common portion of each cone as the shape of the object.

Japanese Patent Laid-Open No. 2003-058911 has disclosed a technique to generate three-dimensional shape data indicating the shape of an object by comparing point cloud data obtained by measurement using a three-dimensional measuring device and the common portion of cones estimated by using a plurality of captured images obtained by capturing the object. Specifically, the technique disclosed in Japanese Patent Laid-Open No. 2003-058911 generates three-dimensional shape data (in the following, also referred to as "curved surface shape data") by applying a curved surface shape indicated by the point cloud data to the estimated common portion of cones represented by meshes.

The technique disclosed in Japanese Patent Laid-Open No. 2003-058911 repeatedly transforms curved surface shape data until the error of the shape of the object indicated by the curved surface shape data converges in order to obtain highly accurate curved surface shape data. Because of this, with the technique disclosed in Japanese Patent Laid-Open No. 2003-058911, there is a case where a tremendous amount of calculation is necessary in order to obtain highly accurate curved surface shape data.

SUMMARY

The information processing apparatus according to the present disclosure includes: one or more hardware processors; and one or more memories storing one or more programs configured to be executed by the one or more hardware processors, the one or more programs including instructions for: obtaining data of a plurality of captured images obtained by capturing an object from a plurality of viewpoints; obtaining first three-dimensional shape data indicating a shape of the object, which includes information indicating a spatial position of each of a plurality of feature points indicating features of the object; and obtaining second three-dimensional shape data indicating the shape of the object by using the captured image; wherein the first three-dimensional shape data is obtained, based on reliability of the spatial position of each of the plurality of feature points and the second three-dimensional shape data.

Further features of the present disclosure will become apparent from the following description of exemplary embodiments with reference to the attached drawings.

BRIEF DESCRIPTION OF THE DRAWINGS

FIG. 6A is a flowchart showing an example of a processing flow of a first shape obtaining unit according to Embodiment 2 and FIG. 6B is a flowchart showing an example of a processing flow of a reliability determination unit according to Embodiment 2;

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

Embodiment 1

In Embodiment 1, as an example, an aspect is explained in which the reliability of a spatial position of a feature point is determined from the extraction accuracy of the feature point of a face (in the following, referred to as "face feature point") extracted from an image obtained by capturing the face of a person.

<Configuration of Information Processing Apparatus>

Figure 1:
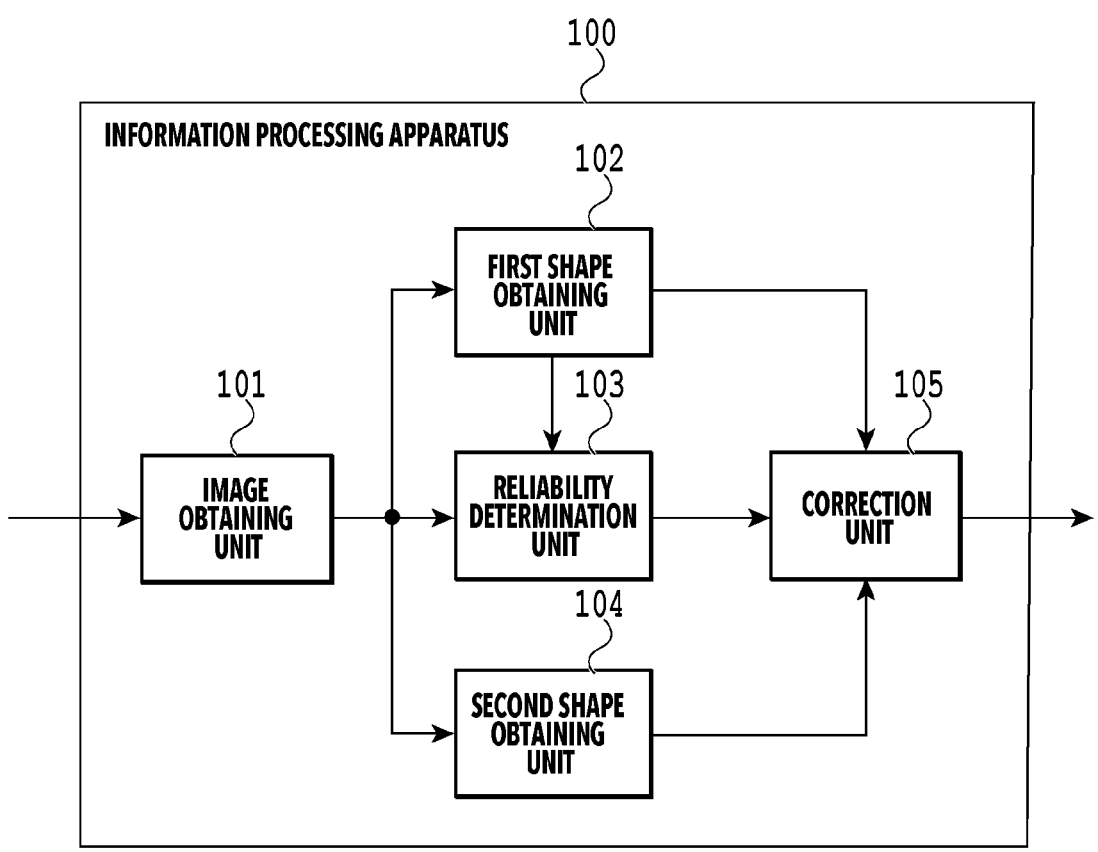
FIG. 1 is a block diagram showing an example of a configuration of a function block of an information processing apparatus according to Embodiment 1.
Figure 2:
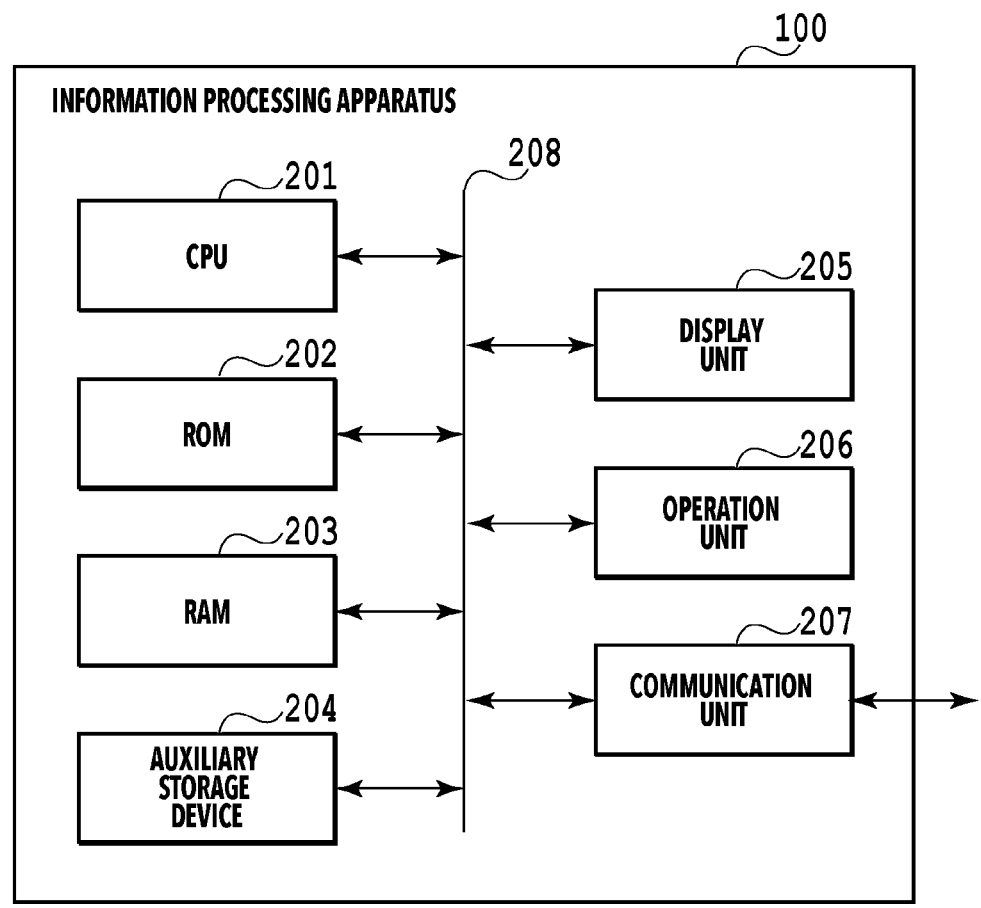
FIG. 2 is a block diagram showing an example of a hardware configuration of the information processing apparatus according to Embodiment 1.

With reference to FIG. 1 and FIG. 2, the configuration of an information processing apparatus 100 according to Embodiment 1 is explained. FIG. 1 is a block diagram showing an example of the configuration of a function block of the information processing apparatus 100 according to Embodiment 1. The information processing apparatus 100 comprises an image obtaining unit 101, a first shape obtaining unit 102, a reliability determination unit 103, a second shape obtaining unit 104, and a correction unit 105. The processing of each unit comprised by the information processing apparatus 100 is performed by hardware, such as an ASIC (Application Specific Integrated Circuit), incorporated in the information processing apparatus 100. The processing may also be performed by hardware, such as an FPGA (Field Programmable Gate Array). Further, the processing may also be performed by software using a memory, such as a RAM (Random Access Memory), and a processor, such as a CPU (Central Processor Unit). Details of the processing of each unit shown in FIG. 1 will be described later.

With reference to FIG. 2, the hardware configuration of the information processing apparatus 100 in a case where each unit comprised by the information processing apparatus 100 according to Embodiment 1 operates as software is explained. FIG. 2 is a block diagram showing an example of the hardware configuration of the information processing apparatus 100 according to Embodiment 1. The information processing apparatus 100 includes a computer and the computer has a CPU 201, a ROM 202, a RAM 203, an auxiliary storage device 204, a display unit 205, an operation unit 206, a communication unit 207, and a bus 208 as shown in FIG. 2 as an example.

The CPU 201 is a processor that causes the computer to function as each unit comprised by the information processing apparatus 100 shown in FIG. 1 by controlling the computer by using programs or data stored in the ROM 202, the RAM 203 or the like. It may also be possible for the information processing apparatus 100 to have one piece or a plurality of pieces of dedicated hardware different from the CPU 201 and the dedicated hardware may perform at least part of the processing that is performed by the CPU 201. As examples of the dedicated hardware, there are an ASIC, an FPGA, a DSP (Digital Signal Processor) and the like. The ROM 202 is a memory that stores programs and the like that do not need to be changed. The RAM 203 is a memory that temporarily stores programs or data supplied from the auxiliary storage device 204, data and the like supplied from the outside via the communication unit 207. The auxiliary storage device 204 includes, for example, a hard disk drive, and stores various kinds of data, such as image data or voice data.

The display unit 205 includes, for example, a liquid crystal display, an LED or the like and displays a GUI (Graphical User Interface) and the like for a user to operate the information processing apparatus 100 or to browse the state of processing in the information processing apparatus 100. The operation unit 206 includes, for example, a keyboard, a mouse, a joystick, a touch panel or the like and inputs various instructions to the CPU 201 upon receipt of the operation by a user. The CPU 201 operates also as a display control unit configured to control the display unit 205 and an operation control unit configured to control the operation unit 206.

The communication unit 207 is used for communication, such as transmission and reception of data and the like to and from an external device of the information processing apparatus 100. For example, in a case where the information processing apparatus 100 is connected with an external device by wire, a communication cable is connected to the communication unit 207. In a case where the information processing apparatus 100 has a function to wirelessly communicate with an external device, the communication unit 207 comprises an antenna. The bus 208 connects each unit comprised by the information processing apparatus 100 and transmits information. In Embodiment 1, explanation is given on the assumption that the display unit 205 and the operation unit 206 exist inside the information processing apparatus 100, but at least one of the display unit 205 and the operation unit 206 may exist outside the information processing apparatus 100 as a separate device.

<Processing of Each Unit Comprised by Information Processing Apparatus>

The processing of each unit shown in FIG. 1 is explained. The image obtaining unit 101 obtains data (in the following, also referred to as "captured image data") of a plurality of images (in the following, referred to as "captured images") obtained by capturing an object from a plurality of viewpoints different from one another (in the following, referred to as "multiple viewpoints"). In the following, a plurality of captured images obtained by performing image capturing from multiple viewpoints is referred to as multi-viewpoint images. In the present embodiment, as an example, an aspect is explained in a case where the object is the face of a person, but the object is not limited to the face of a natural person and the object may be an animal including a natural person, a plant, or the whole or part of a stationary object and the like, such as a doll or a vehicle. For example, the image obtaining unit 101 obtains data of multi-viewpoint images (in the following, also referred to as "multi-viewpoint image data") by obtaining captured image data via the communication unit 207 from each of the plurality of imaging apparatuses having captured the multi-viewpoint images. The source from which each piece of captured image data included in multi-viewpoint image data is obtained is not limited to the imaging apparatus and it may also be possible for the image obtaining unit 101 to obtain multi-viewpoint image data by reading the multi-viewpoint image data from the auxiliary storage device 204 or the like having stored multi-viewpoint image data in advance.

Further, it may also be possible for the image obtaining unit 101 to obtain, in addition to multi-viewpoint image data, camera parameters corresponding to captured image data included in the multi-viewpoint image data, that is, camera parameters indicating image capturing conditions and the like used by each imaging apparatus at the time of capturing a captured image. In the following, explanation is given on the assumption that the image obtaining unit 101 obtains multi-viewpoint image data and camera parameters. Here, it is assumed that the camera parameters according to the present embodiment include information indicating the position of the imaging apparatus, the direction of the light axis of the imaging apparatus, the viewing angle at the time of performing image capturing, and the like.

The first shape obtaining unit 102 obtains first three-dimensional shape data (in the following, referred to as "feature point shape data") indicting the shape of an object (in the present embodiment, the face of a natural person), which includes information indicating each spatial position of a plurality of points indicating the feature of the object (in the following, referred to as "feature point"). Specifically, the first shape obtaining unit 102 according to the present embodiment generates and obtains feature point shape data by using each piece of captured image data obtained by the image obtaining unit 101. For example, first, the first shape obtaining unit 102 obtains, in each captured image, the position of the feature point of the object captured in each captured image by using a feature point list in which information indicating each of the plurality of feature points of the object is listed in advance and each piece of captured image data obtained by the image obtaining unit 101.

Here, the feature point of a face (face feature point) is a characteristic region configuring the face of a natural person, such as the corner of left eye, the left inner canthus, or the corner of right eye, and the feature point list is a list in which information is listed, which indicates the feature point, such as the corner of left eye, the left inner canthus, or the corner of right eye, whose position is desired to be obtained in the captured image. In the following, explanation is given on the assumption that the feature point list is a list in which information indicating a feature point is listed by an identifying ID that is represented by an integer or the like different from one another and not less than 0.

For example, the first shape obtaining unit 102 obtains information indicating the position of a feature point in a captured image by using a feature point detector using a trained model generated by machine learning. In this case, the feature point detector identifies the feature point designated in the feature point list, such as the corner of left eye, the left inner canthus, or the corner of right eye, from the captured image and outputs information indicating the position of the identified feature point in the captured image. In the following, explanation is given on the assumption that the position of a feature point in a captured image is obtained by using the feature point detector, but the position obtaining method is not limited to this. For example, it may also be possible for the first shape obtaining unit 102 to obtain information indicating the position of a feature point in a captured image by assuming that the position on the captured image, which is designated by a user operation or the like, is the position of the feature point in the captured image. Further, in the following, explanation is given on the assumption that information indicating the position of a feature point in a captured image is given by two-dimensional coordinates that represent the plane of the image in the captured image in a two-dimensional coordinate system, with the position of the center of the captured image, the position of the upper-left end portion of the captured image or the like being taken to be the origin.

After obtaining, in each captured image, the position of the feature point of the object captured in each captured image, for example, the first shape obtaining unit 102 obtains the position (spatial position) in the three-dimensional space of the feature point as three-dimensional coordinates from the two-dimensional coordinates indicating the position of the feature point in each captured image. Specifically, for example, the first shape obtaining unit 102 calculates and obtains the spatial position (three-dimensional coordinates) of the feature point based on information indicating the position of each imaging apparatus, which is included in the camera parameters obtained by the image obtaining unit 101, and the obtained position (two-dimensional coordinates) of the feature point in each captured image. More specifically, first, the first shape obtaining unit 102 calculates a ray vector passing the position of the imaging apparatus and the obtained position of the feature point in the captured image. Next, the first shape obtaining unit 102 calculates the position of the intersection of the ray vectors corresponding to the same feature point in each of at least the two captured images different from each other and obtains the calculated position of the intersection as the spatial position of the feature point. It is possible to apply the above-described spatial position obtaining method of a feature point to a case where there exist two or more captured images in which the same feature point is captured.

After obtaining the spatial position of each feature point, for example, the first shape obtaining unit 102 generates three-dimensional shape data including information indicating the spatial position of each feature point and obtains the generated three-dimensional shape data as feature point shape data. Specifically, for example, the first shape obtaining unit 102 generates feature point shape data as data (in the following, also referred to as "feature point cloud data") of a point cloud (in the following, also referred to as "feature point cloud") indicating the spatial position of each feature point. The feature point shape data that is generated by the first shape obtaining unit 102 may be mesh data indicating the surface shape of an object, which consists of polygonal polygons, such as triangular polygons, whose vertex being each of the plurality of feature points included in the feature point cloud.

The reliability determination unit 103 determines the reliability of information indicating the spatial position of each feature point included in the feature point shape data generated by the first shape obtaining unit 102. Specifically, for example, the reliability determination unit 103 determines the reliability of information indicating the spatial position of each feature point included in the feature point shape data based on the identification accuracy of the position of the feature point captured in the captured image. More specifically, for example, the reliability determination unit 103 determines that the reliability is high for information indicating the spatial position of the feature point included in the feature point shape data, which corresponds to the feature point whose identification accuracy of the position of the feature point captured in the captured image is high. Further, the reliability determination unit 103 determines that the reliability is low for information indicating the spatial position of the feature point included in the feature point shape data, which corresponds to the feature point whose identification accuracy of the position of the feature point captured in the captured image is low.

Here, it is assumed that the identification accuracy of the position of the feature point captured in the captured image is, for example, determined in advance for each type of feature point and information indicating the identification accuracy of the feature point is included in advance in the feature point list in association with the identifying ID indicating the feature point. In this case, the reliability determination unit 103 determines the reliability of information indicating the spatial position of each feature point included in the feature point shape data based on information indicating the identification accuracy of the feature point included in the feature point list. For example, in a case where the feature point of the face (face feature point) of a natural person is identified by using the feature point detector, in the feature point list, for the feature point whose feature is hard to capture and whose identification accuracy is unstable, such as the position of eyeball or the center of mouth, or the position of the nose tip, the identification accuracy is set low in advance. The identification accuracy of the position of the feature point captured in the captured image is not limited to those set in advance in the feature point list. For example, in a case where the feature point detector is one that also outputs information indicating the estimation accuracy of the position of the feature point, in addition to information indicating the position of the feature point in the captured image, it may also be possible for the reliability determination unit 103 to determine the reliability by using information indicating the estimation accuracy as information indicating the identification accuracy.

The second shape obtaining unit 104 obtains second three-dimensional shape data (in the following, referred to as "object shape data") indicating the shape of an object (in the present embodiment, the face of a natural person) by using the multi-viewpoint image data obtained by the image obtaining unit 101. Specifically, the second shape obtaining unit 104 first generates a silhouette image indicating the image area in which the object is captured in the captured image for each of the plurality of captured images configuring the multi-viewpoint images by using the multi-viewpoint image data obtained by the image obtaining unit 101. Here, the silhouette image is an image obtained by binarizing the captured image by setting the pixel value of the pixel corresponding to the image area in which the object is captured in the captured image to 1 (white) and the pixel value of the pixel corresponding to the image area in which the object is not captured to 0 (black). Next, the second shape obtaining unit 104 generates and obtains object shape data indicating the shape of the object by applying the visual hull method using the plurality of generated silhouette images.

In the following, explanation is given on the assumption that the second shape obtaining unit 104 generates voxel data, as the object shape data, which takes the voxels corresponding to the object to be ON voxels and the other voxels to be OFF voxels. The object shape data that the second shape obtaining unit 104 generates is not limited to voxel data, but may be point cloud data or mesh data consisting of polygonal polygons, such as a plurality of triangular polygons corresponding to the surface of the object. Further, in the following, explanation is given on the assumption that the voxel corresponding to the surface of the object among the voxels indicated by the voxel data is referred to as the surface voxel. The generation method of three-dimensional shape data by the visual hull method using multi-viewpoint image data is well known, and therefore, detailed explanation thereof is omitted.

The correction unit 105 corrects information indicating the spatial position of each feature point included in the feature point shape data based on the reliability of information indicating the spatial position of each feature point included in the feature point shape data generated by the first shape obtaining unit 102. Specifically, the correction unit 105 changes information indicating the spatial position of each feature point included in the feature point shape data based on the determination results of the reliability by the reliability determination unit 103. More specifically, the correction unit 105 changes information indicating the spatial position of each feature point included in the feature point shape data, whose reliability has been determined to be low by the reliability determination unit 103, by using the object shape data obtained by the second shape obtaining unit 104.

For example, the correction unit 105 identifies one or more viewpoints from which the captured image is captured, in which at least one of the plurality of feature points determined in the feature point list is captured, from among the plurality of viewpoints. Next, the correction unit 105 generates a depth map in a case where the point corresponding to the surface of the object in the object shape data is viewed from each identified viewpoint based on the camera parameters of the imaging apparatus corresponding to each identified viewpoint and the spatial position of the point (for example, surface voxel) corresponding to the surface of the object in the object shape data obtained by the second shape obtaining unit 104. Next, the correction unit 105 obtains two-dimensional coordinates in the captured image in a case where the three-dimensional coordinates of each feature point in the feature point shape data whose reliability has been determined to be low by the reliability determination unit 103 are projected onto the captured image by using the camera parameters of the imaging apparatus having captured the captured image in which the feature point is captured. Next, the correction unit 105 obtains, as the depth value of the feature point, the pixel value of the pixel corresponding to the two-dimensional coordinates in the depth map in a case where the point corresponding to the surface of the object in the object shape data is viewed from the viewpoint corresponding to the imaging apparatus having captured the captured image. Next, the correction unit 105 obtains three-dimensional coordinates by back projecting the two-dimensional coordinates with the obtained depth value and changes the three-dimensional coordinates of the feature point in the feature point shape data, whose reliability has been determined to be low by the reliability determination unit 103, by using the obtained three-dimensional coordinates.

<Processing Flow of Information Processing Apparatus>

Figure 3:
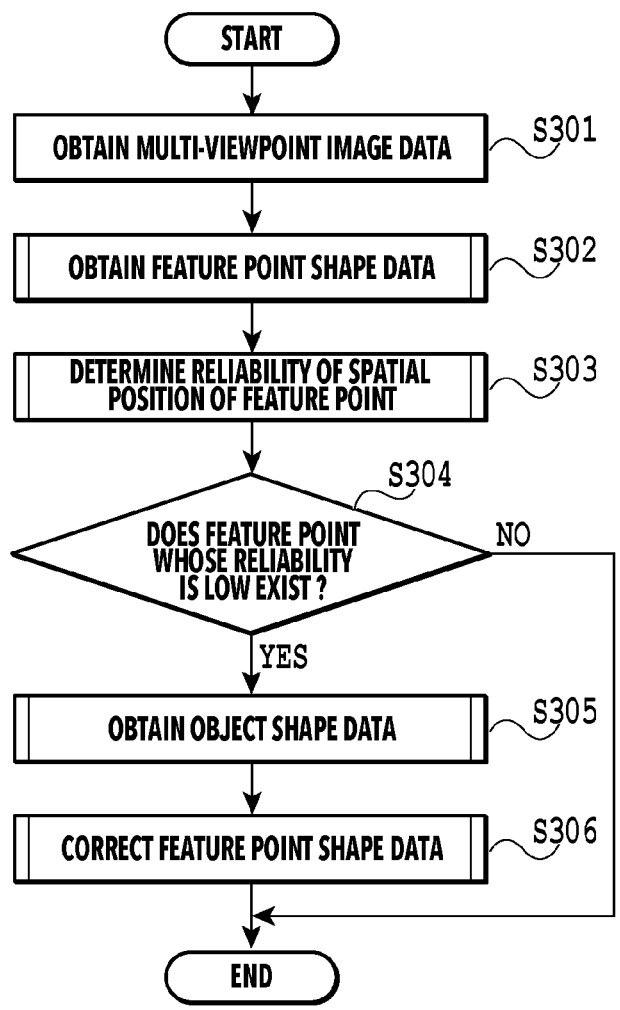
FIG. 3 is a flowchart showing an example of a processing flow of the information processing apparatus according to Embodiment 1.

With reference to FIG. 3 to FIG. 5B, the operation of the information processing apparatus 100 is explained. FIG. 3 is a flowchart showing an example of a processing flow of the information processing apparatus 100 according to Embodiment 1. In the following explanation, symbol "S" means a step. At S301, the image obtaining unit 101 obtains multi-viewpoint image data. Next, at S302, the first shape obtaining unit 102 obtains feature point shape data. With reference to FIG. 4A, the processing at S302 is explained. FIG. 4A is a flowchart showing an example of a processing flow of the first shape obtaining unit 102 at S302 according to Embodiment 1. The first shape obtaining unit 102 first, at S401, obtains the position of the feature point in each captured image based on each piece of captured image data configuring the multi-viewpoint image data. Next, at S402, the first shape obtaining unit 102 calculates and obtains the spatial position of the feature point based on the position of the feature point in each captured image, which is obtained at S401. Next, at S403, the first shape obtaining unit 102 generates feature point shape data including information indicating the spatial position of the feature point, which is obtained at S402. After S403, the first shape obtaining unit 102 ends the processing of the flowchart shown in FIG. 4A.

Figures 4A, 4B:
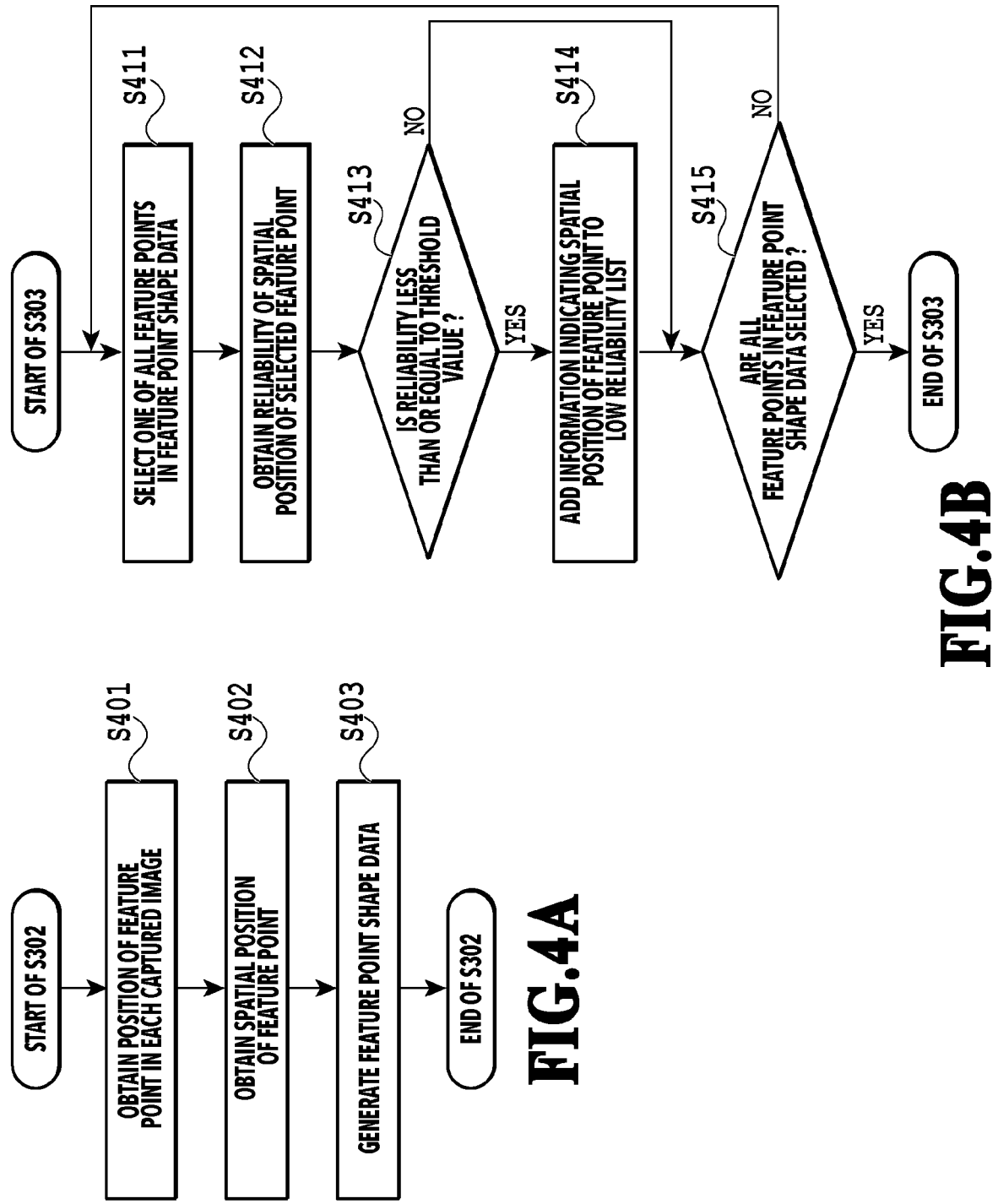
FIG. 4A is a flowchart showing an example of a processing flow of a first shape obtaining unit according to Embodiment 1 and FIG. 4B is a flowchart showing an example of a processing flow of a reliability determination unit according to Embodiment 1.

After S302, at S303, the reliability determination unit 103 determines the reliability of information indicating the spatial position of each feature point included in the feature point shape data obtained at S302. With reference to FIG. 4B, the processing at S303 is explained. FIG. 4B is a flowchart showing an example of a processing flow of the reliability determination unit 103 at S303 according to Embodiment 1. The reliability determination unit 103 first, at S411, selects one of all the feature points in the feature point shape data. Next, at S412, the reliability determination unit 103 obtains, as information indicating the reliability of the spatial position of the feature point, information indicating the identification accuracy corresponding to the feature point selected at S411 from information indicating the identification accuracy of the feature point included in the feature point list. Next, at S413, the reliability determination unit 103 determines whether or not the reliability obtained at S412 is less than or equal to a threshold value determined in advance. In a case where it is determined that the reliability is less than or equal to the threshold value at S413, the reliability determination unit 103 adds information indicating the spatial position of the feature point to a low reliability list at S414.

After S414, or in a case where it is determined that the reliability is not less than or equal to the threshold value at S413, the reliability determination unit 103 determines whether or not all the feature points in the feature point shape data are selected at S415. In a case where it is determined that all the feature points in the feature point shape data are not selected at S415, the processing returns to S411 and the reliability determination unit 103 selects one feature point that has not been selected so far from among the plurality of feature points in the feature point shape data. The reliability determination unit 103 repeatedly performs the processing at S411 to S415 until it is determined that all the feature points in the feature point shape data are selected at S415. In a case where it is determined that all the feature points in the feature point shape data are selected at S415, the reliability determination unit 103 ends the processing of the flowchart shown in FIG. 4B.

Figures 5A, 5B:
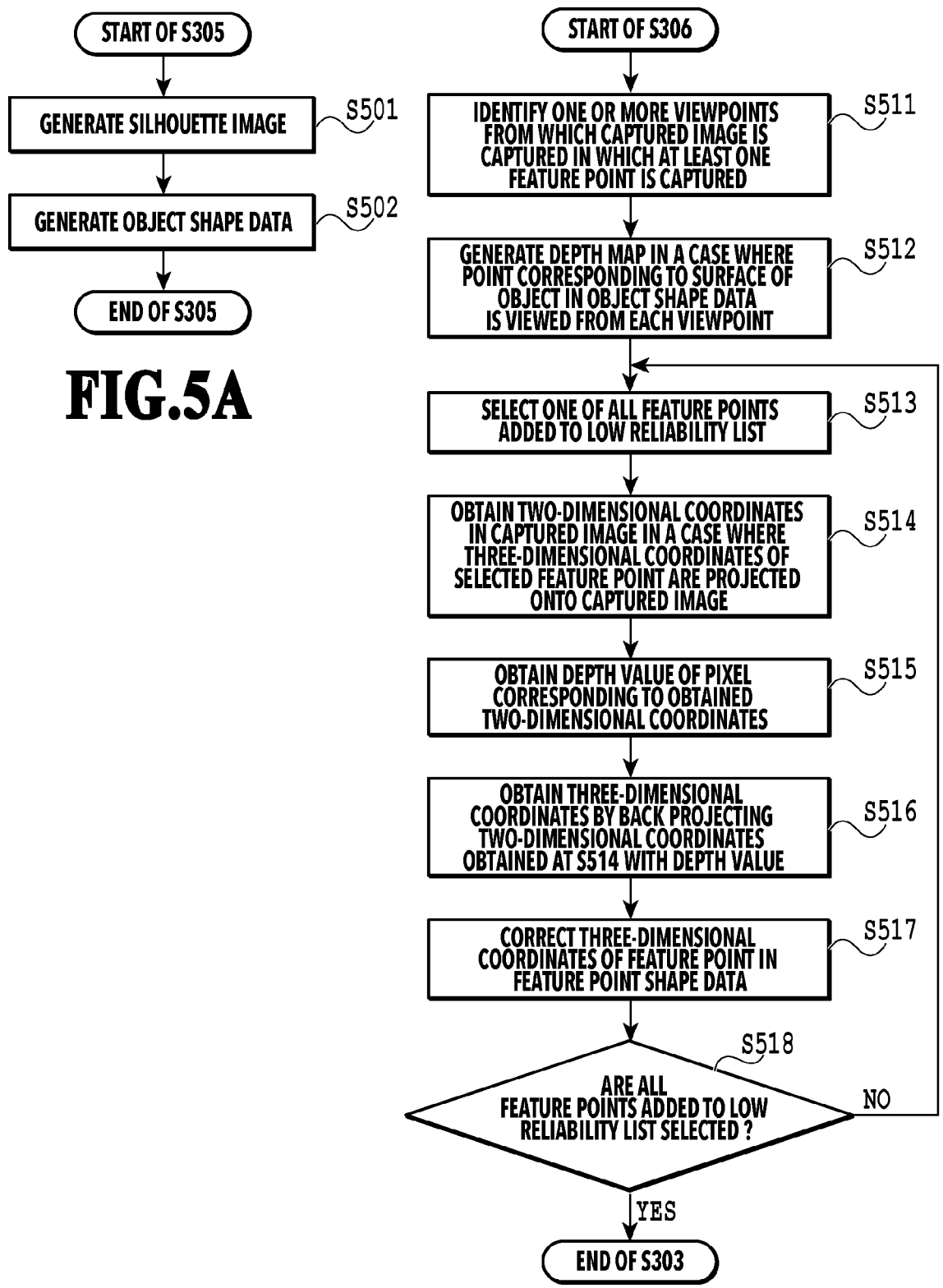
FIG. 5A is a flowchart showing an example of a processing flow of a second shape obtaining unit according to Embodiment 1 and FIG. 5B is a flowchart showing an example of a processing flow of a correction unit according to Embodiment 1.

After S303, at S304, the second shape obtaining unit 104 determines whether or not there exists a feature point whose reliability is low, that is, determines whether or not there exists even one feature point whose reliability is less than or equal to a threshold value. In a case where it is determined that there exists not a single feature point whose reliability is low at S304, the information processing apparatus 100 ends the processing of the flowchart shown in FIG. 3. In a case where it is determined that there exists even one feature point whose reliability is low at S304, the second shape obtaining unit 104 generates and obtains object shape data at S305. With reference to FIG. 5A, the processing at S305 is explained. FIG. 5A is a flowchart showing an example of a processing flow of the second shape obtaining unit 104 at S305 according to Embodiment 1. The second shape obtaining unit 104 first, at S501, generates a silhouette image corresponding to each captured image by using each piece of captured image data configuring the multi-viewpoint image data obtained at S301. Next, at S502, the second shape obtaining unit 104 generates and obtains object shape data by the visual hull method using the silhouette image generated at S501. After S502, the second shape obtaining unit 104 ends the processing of the flowchart shown in FIG. 5A.

After S305, at S306, the correction unit 105 corrects the feature point shape data. After S306, the information processing apparatus 100 ends the processing of the flowchart shown in FIG. 3. With reference to FIG. 5B, the processing at S306 is explained. FIG. 5B is a flowchart showing an example of a processing flow of the correction unit 105 at S306 according to Embodiment 1. The correction unit 105 first, at S511, identifies one or more viewpoints from which the captured image is captured, in which at least one of the plurality of feature points determined in the feature point list is captured, from among the plurality of viewpoints. Next, at S512, the correction unit 105 generates a depth map in a case where the point corresponding to the surface of the object in the object shape data is viewed from each viewpoint identified at S511 based on the camera parameters of the imaging apparatus corresponding to each viewpoint identified at S511 and the object shape data obtained at S305. Next, at S513, the correction unit 105 selects one of all the feature points added to the low reliability list at S414. Next, at S514, the correction unit 105 obtains two-dimensional coordinates in the captured image in a case where the three-dimensional coordinates of the feature point selected at S513 are projected onto the captured image by using the camera parameters of the imaging apparatus having captured the captured image in which the feature point is captured.

Next, at S515, the correction unit 105 obtains the depth value of the pixel corresponding to the two-dimensional coordinates obtained at S514 in the depth map generated at S511. Next, at S516, the correction unit 105 obtains three-dimensional coordinates by back projecting the two-dimensional coordinates obtained at S514 with the depth value obtained at S515. Next, at S517, the correction unit 105 corrects the three-dimensional coordinates of the feature point in the feature point shape data, which is selected at S513, by using the three-dimensional coordinates obtained at S516. Next, at S518, the correction unit 105 determines whether or not all the feature points added to the low reliability list are selected. In a case where it is determined that all the feature points added to the low reliability list are not selected at S518, the processing returns to S513 and the correction unit 105 selects one feature point that has not been selected so far from among all the feature points added to the low reliability list. The correction unit 105 repeatedly performs the processing at S513 to S518 until it is determined that all the feature points added to the low reliability list are selected at S518. In a case where it is determined that all the feature points added to the low reliability list are selected at S518, the correction unit 105 ends the processing of the flowchart shown in FIG. 5B.

According to the information processing apparatus 100 configured as above, it is possible to easily obtain highly accurate three-dimensional shape data.

Embodiment 2

The information processing apparatus 100 according to Embodiment 1 generates the feature point shape data by using the obtained multi-viewpoint image data. Further, the information processing apparatus 100 according to Embodiment 1 corrects (changes) the feature point shape data by assuming the reliability of the spatial position of the feature point corresponding to the feature point whose identification accuracy is low to be low based on the identification accuracy of the feature point in the captured image. In contrast to this, the information processing apparatus 100 according to Embodiment 2 obtains data of a point cloud, which is measurement results by a three-dimensional measuring device that measures the three-dimensional shape of an object, and obtains feature point shape data in which each of a plurality of points included in the point cloud is taken to be a feature point. Further, the information processing apparatus 100 according to Embodiment 2 corrects (changes) feature point shape data by assuming the reliability of the spatial position of a point whose identification accuracy is low to be low based on measurement data indicating the identification accuracy of each of the plurality of points included in the point cloud.

<Configuration of Information Processing Apparatus According to Embodiment 2>

The information processing apparatus 100 according to Embodiment 2 (in the following, simply referred to as "information processing apparatus 100") comprises the image obtaining unit 101, the first shape obtaining unit 102, the reliability determination unit 103, the second shape obtaining unit 104, and the correction unit 105 shown in FIG. 1. The processing of each unit comprised by the information processing apparatus 100 is performed by hardware, such as an ASIC or FPGA, incorporated in the information processing apparatus 100, or by software or the like using a memory, such as a RAM, and a processor, such as a CPU, shown as an example in FIG. 2.

In the following, the processing of the first shape obtaining unit 102, the reliability determination unit 103, and the correction unit 105 according to Embodiment 2 (in the following, simply referred to as "first shape obtaining unit 102", "reliability determination unit 103", and "correction unit 105") is explained. The processing of the image obtaining unit 101 and the second shape obtaining unit 104 according to Embodiment 2 (in the following, simply referred to as "image obtaining unit 101" and "second shape obtaining unit 104") is the same as that of the image obtaining unit 101 and the second shape obtaining unit 104 according to Embodiment 1, and therefore, explanation is omitted.

<Processing of Each Unit Comprised by Information Processing Apparatus According to Embodiment 2>

The first shape obtaining unit 102 obtains data of a point cloud (in the following, also referred to as "point cloud data") indicating the shape of an object, which is measurement results by a three-dimensional measuring device that measures the three-dimensional shape of an object and measurement data indicating the identification accuracy of each of a plurality of points included in the point cloud. The first shape obtaining unit 102 obtains feature point shape data in which each of the plurality of points included in the point cloud is taken to be a feature point. Here, the three-dimensional measuring device is a device that measures the distance to an object by irradiating the object with laser light, radio wave or the like and using the reflected beam, reflected wave or the like, such as LiDAR (Light Detection And Ranging) and Radar (Radio Detecting and Ranging). In the following, explanation is given on the assumption that the three-dimensional measuring device is LiDAR. Further, the measurement data is information indicating the reflectance, which is a value of the ratio between the quantity of reflected light received by the light-receiving unit of the reflected light that reflects from the object and the quantity of laser light with which the object is irradiated, and includes information indicating the reflectance corresponding to each point included in the point cloud. In the following, it is assumed that the information processing apparatus 100 uses the reflectance corresponding to each point as the measurement accuracy of each point.

The reliability determination unit 103 determines the reliability of information indicating the spatial position of each point included in the point cloud, that is, each feature point included in the feature point shape data based on the measurement accuracy of each of the plurality of points included in the point cloud, which is indicated by the measurement data obtained by the first shape obtaining unit 102. Specifically, the reliability determination unit 103 compares the measurement accuracy and a threshold value determined in advance and determines the reliability of the spatial position of the feature point corresponding to the point whose measurement accuracy is less than or equal to the threshold value to be low.

The correction unit 105 corrects information indicating the spatial position of each feature point included in the feature point shape data based on the reliability of information indicating the spatial position of each feature point in the feature point shape data generated by the first shape obtaining unit 102. Specifically, the correction unit 105 corrects information indicating the spatial position of each feature point included in the feature point shape data based on the determination results of the reliability by the reliability determination unit 103. More specifically, the correction unit 105 corrects information indicating the spatial position of each feature point included in the feature point shape data, whose reliability has been determined to be low by the reliability determination unit 103, by using the object shape data obtained by the second shape obtaining unit 104.

For example, the correction unit 105 first compares the spatial position of each point corresponding to the surface of the object in the object shape data obtained by the second shape obtaining unit 104 and the spatial position of each feature point in the feature point shape data, whose reliability has been determined to be low by the reliability determination unit 103. Specifically, the correction unit 105 identifies the point corresponding to the surface of the object in the object shape data, which is located at the spatial position whose Euclid distance to the spatial position of each feature point, whose reliability is low, in the feature point shape data is the shortest. Next, the correction unit 105 corrects the feature point shape data by replacing information indicating the spatial position of each feature point, whose reliability is low, in the feature point shape data with information indicating the spatial position of the identified point corresponding to the surface of the object in the object shape data.

<Processing Flow of Information Processing Apparatus According to Embodiment 2>

With reference to FIG. 3, FIG. 6A, and FIG. 6B, the operation of the information processing apparatus 100 is explained. First, at S301, the image obtaining unit 101 obtains multi-viewpoint image data. Next, at S302, the first shape obtaining unit 102 obtains feature point shape data. With reference to FIG. 6A, the processing at S302 according to Embodiment 2 is explained. FIG. 6A is a flowchart showing an example of a processing flow of the first shape obtaining unit 102 at S302 according to Embodiment 2. The first shape obtaining unit 102 first, at S601, obtains the point cloud data indicating the shape of an object and the measurement data indicating the measurement accuracy of each point included in the point cloud, which are output from the three-dimensional measuring device. Next, at S602, the first shape obtaining unit 102 obtains the point cloud data obtained at S601 as feature point shape data. After S602, the first shape obtaining unit 102 ends the processing of the flowchart shown in FIG. 6A.

After S302, at S303, the reliability determination unit 103 determines the reliability of information indicating the spatial position of each feature point included in the feature point shape data obtained at S302. With reference to FIG. 6B, the processing at S303 according to Embodiment 2 is explained. FIG. 6B is a flowchart showing an example of a processing flow of the reliability determination unit 103 at S303 according to Embodiment 2. The reliability determination unit 103 first, at S611, selects one of all the feature points in the feature point shape data. Next, at S612, the reliability determination unit 103 obtains information indicating the measurement accuracy corresponding to the feature point selected at S611 from the measurement data as information indicating the reliability of the spatial position of the feature point. Next, at S613, the reliability determination unit 103 determines whether or not the reliability obtained at S612 is less than or equal to a threshold value determined in advance. In a case where it is determined that the reliability is less than or equal to the threshold value at S613, the reliability determination unit 103 adds information indicating the spatial position of the feature point to the low reliability list.

After S614, or in a case where it is determined that the reliability is not less than or equal to the threshold value at S613, the reliability determination unit 103 determines whether or not all the feature points in the feature point shape data are selected at S615. In a case where it is determined that all the feature points in the feature point shape data are not selected at S615, the processing returns to S611 and the reliability determination unit 103 selects one feature point that has not been selected so far from among the plurality of feature points in the feature point shape data. The reliability determination unit 103 repeatedly performs the processing at S611 to S615 until it is determined that all the feature points in the feature point shape data are selected at S615. In a case where it is determined that all the feature points in the feature point shape data are selected at S615, the reliability determination unit 103 ends the processing of the flowchart shown in FIG. 6B.

After S303, at S304, the second shape obtaining unit 104 determines whether or not there exists a feature point whose reliability is low, that is, determines whether or not there exists even one feature point whose reliability is less than or equal to a threshold value. In a case where it is determined that there exists not a single feature point whose reliability is low at S304, the information processing apparatus 100 ends the processing of the flowchart shown in FIG. 3. In a case where it is determined that there exists even one feature point whose reliability is low at S304, the second shape obtaining unit 104 generates and obtains object shape data at S305.

Figure 7:
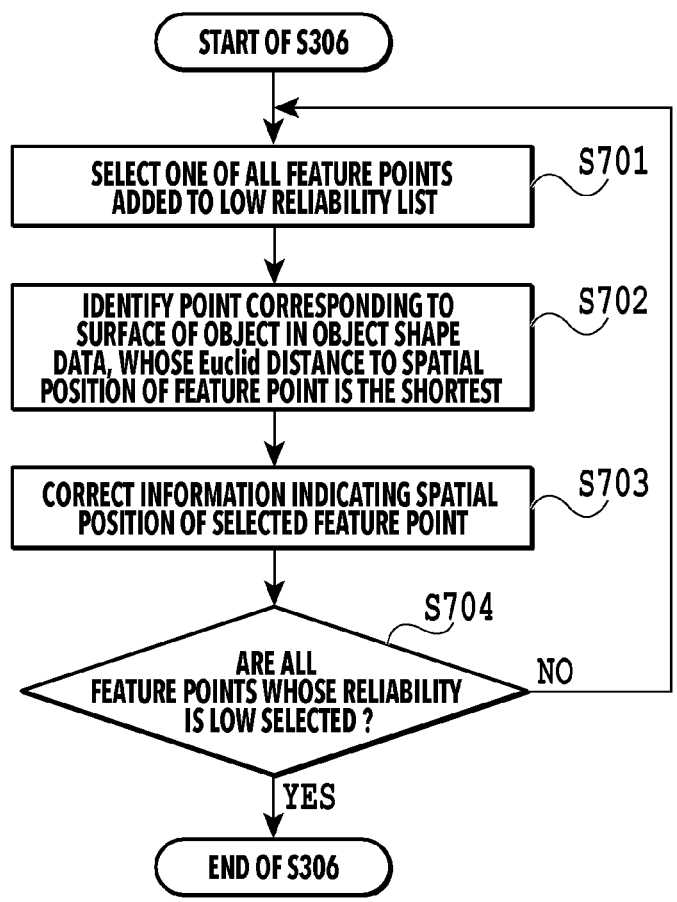
FIG. 7 is a flowchart showing an example of a processing flow of a correction unit according to Embodiment 2.

After S305, at S306, the correction unit 105 corrects the feature point shape data. After S306, the information processing apparatus 100 ends the processing of the flowchart shown in FIG. 3. With reference to FIG. 7, the processing at S306 is explained. FIG. 7 is a flowchart showing an example of a processing flow of the correction unit 105 at S306 according to Embodiment 2. The correction unit 105 first, at S701, selects one of all the feature points added to the low reliability list at S614. Next, at S702, the correction unit 105 identifies the point corresponding to the surface of the object in the object shape data obtained at S305, which is located at the spatial position whose Euclid distance to the spatial position of the feature point selected at S701 is the shortest. Next, at S703, the correction unit 105 corrects information indicating the spatial position of the feature point selected at S701 in the feature point shape data obtained at S302 by using information indicating the spatial position of the point identified at S702 and corresponding to the surface of the object.

Next, at S704, the correction unit 105 determines whether or not all the feature points added to the low reliability list are selected. In a case where it is determined that all the feature points added to the low reliability list are not selected at S704, the processing returns to S701 and the correction unit 105 selects one feature point that has not been selected so far from among all the feature points added to the low reliability list. The correction unit 105 repeatedly performs the processing at S701 to S704 until it is determined that all the feature points added to the low reliability list are selected at S704. In a case where it is determined that all the feature points added to the low reliability list are selected at S704, the correction unit 105 ends the processing of the flowchart shown in FIG. 7.

According to the information processing apparatus 100 configured as above, it is possible to easily obtain highly accurate three-dimensional shape data.

Embodiment 3

The information processing apparatus 100 according to Embodiment 1 generates the feature point shape data by using the obtained multi-viewpoint image data. Further, the information processing apparatus 100 according to Embodiment 2 obtains the data of the point cloud, which is the measurement results of the three-dimensional measuring device that measures the three-dimensional shape of the object, and obtains the feature point shape data in which each of the plurality of points included in the point cloud is taken to be the feature point. In contrast to this, the information processing apparatus 100 according to Embodiment 3 adds an interpolation point, as a feature point, which interpolates between feature points to feature point shape data obtained by the method explained in Embodiment 1 or Embodiment 2. Further, the information processing apparatus 100 obtains three-dimensional shape data after an interpolation point is added thereto as new feature point shape data.

<Configuration of Information Processing Apparatus According to Embodiment 3>

The information processing apparatus 100 according to Embodiment 3 (in the following, simply referred to as "information processing apparatus 100") comprises the image obtaining unit 101, the first shape obtaining unit 102, the reliability determination unit 103, the second shape obtaining unit 104, and the correction unit 105 shown in FIG. 1. The processing of each unit comprised by the information processing apparatus 100 is performed by hardware, such as an ASIC or FPGA, incorporated in the information processing apparatus 100, or by software or the like using a memory, such as a RAM, and a processor, such as a CPU, shown as an example in FIG. 2.

In the following, processing of the first shape obtaining unit 102 and the reliability determination unit 103 according to Embodiment 3 (in the following, simply referred to as "first shape obtaining unit 102" and "reliability determination unit 103") is explained. The processing of the image obtaining unit 101, the second shape obtaining unit 104, and the correction unit 105 according to Embodiment 3 is the same as that of the image obtaining unit 101, the second shape obtaining unit 104, and the correction unit 105 according to Embodiment 1 or Embodiment 2, and therefore, explanation is omitted. In the following, explanation is given by referring to the image obtaining unit 101, the second shape obtaining unit 104, and the correction unit 105 according to Embodiment 3 simply as "image obtaining unit 101", "second shape obtaining unit 104", and "correction unit 105".

<Processing of Each Unit Comprised by Information Processing Apparatus According to Embodiment 3>

The first shape obtaining unit 102 first obtains feature point shape data (in the following, referred to as "first feature point shape data") by the same method as that of the first shape obtaining unit 102 according to Embodiment 1 or Embodiment 2. The first shape obtaining unit 102 generates three-dimensional shape data to which an added interpolation point is added as a new feature point by adding information indicating the spatial position of the interpolation point to the obtained feature point shape data. The first shape obtaining unit 102 obtains the generated three-dimensional shape data as new feature point shape data (in the following, referred to as "second feature point shape data"). Specifically, for example, the first shape obtaining unit 102 adds points and the like corresponding to both ends of the cheek or nose as interpolation points. It may also be possible for the first shape obtaining unit 102 to add arbitrary points and the like, as interpolation points, within the area in which the points corresponding to the surface of an object in the first feature point shape data are sparse. Further, it may also be possible for the first shape obtaining unit 102 to obtain and add a point in the three-dimensional space designated by the operation and the like of a user as an interpolation point.

The reliability determination unit 103 determines the reliability of the spatial position of the feature point corresponding to the feature point in the first feature point shape data among the feature points in the second feature point shape data by the same method as that of the reliability determination unit 103 according to Embodiment 1 or Embodiment 2. Further, the reliability determination unit 103 determines the reliability of the spatial position of the feature point, which is the added interpolation point, among the feature points in the second feature point shape data to be low.

<Processing Flow of Information Processing Apparatus According to Embodiment 3>

Figure 8:
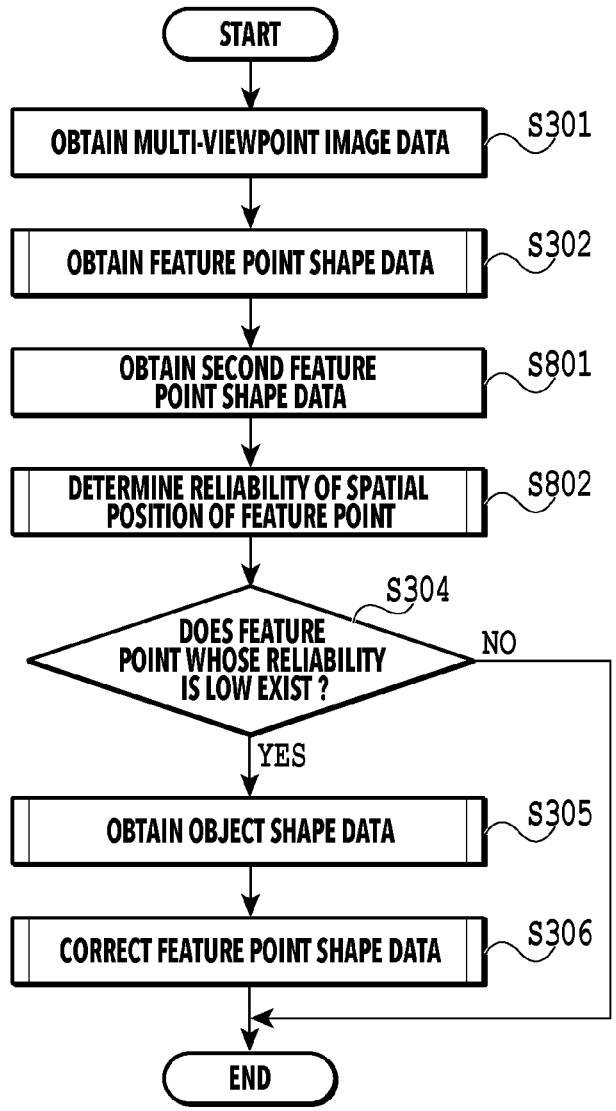
FIG. 8 is a flowchart showing an example of a processing flow of an information processing apparatus according to Embodiment 3.
Figure 9:
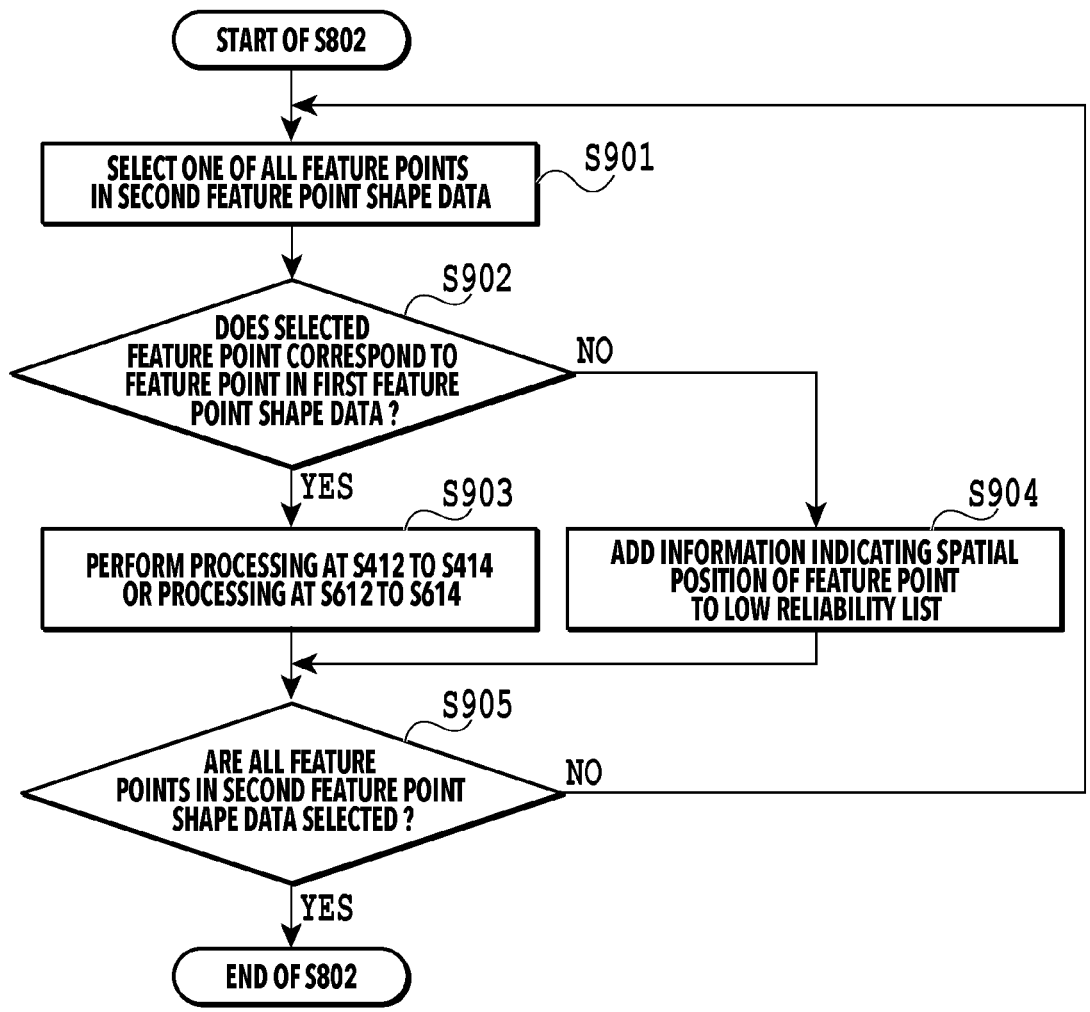
FIG. 9 is a flowchart showing an example of a processing flow of a reliability determination unit according to Embodiment 3.

With reference to FIG. 8 and FIG. 9, the operation of the information processing apparatus 100 is explained. FIG. 8 is a flowchart showing an example of a processing flow of the information processing apparatus 100 according to Embodiment 3. In FIG. 8, to the same processing as that in FIG. 3, the same symbol is attached and explanation thereof is omitted. At S301, the image obtaining unit 101 obtains multi-viewpoint image data. Next, at S302, the first shape obtaining unit 102 obtains feature point shape data (first feature point shape data). Next, at S801, the first shape obtaining unit 102 obtains second feature point shape data, which is the first feature point shape data to which an interpolation point is added as a feature point. Next, at S802, the reliability determination unit 103 determines the reliability of information indicating the spatial position of each feature point included in the second feature point shape data obtained at S801.

With reference to FIG. 9, the processing at S802 is explained. FIG. 9 is a flowchart showing an example of a processing flow of the reliability determination unit 103 at S802 according to Embodiment 3. The reliability determination unit 103 first, at S901, selects one of all the feature points in the second feature point shape data. Next, at S902, the reliability determination unit 103 determines whether or not the feature point selected at S901 is the feature point corresponding to the feature point in the first feature point shape data. In a case where it is determined that the selected feature point is the feature point corresponding to the feature point in the first feature point shape data at S902, the reliability determination unit 103 performs the processing at S412 to S414 shown in FIG. 4B, or the processing at S612 to S614 shown in FIG. 6B at S903. In a case where it is determined that the selected feature point is not the feature point corresponding to the feature point in the first feature point shape data at S902, that is, in a case where the feature point selected at S901 is the interpolation point, the reliability determination unit 103 determines that the reliability of the spatial position of the feature point is low. Consequently, in this case, at S904, the reliability determination unit 103 adds information indicating the spatial position of the feature point to the low reliability list.

After S903 or S904, at S905, the reliability determination unit 103 determines whether or not all the feature points in the second feature point shape data are selected. In a case where it is determined that all the feature points in the second feature point shape data are not selected at S905, the processing returns to S901 and the reliability determination unit 103 selects one feature point that has not been selected so far from among the plurality of feature points in the second feature point shape data. The reliability determination unit 103 repeatedly performs the processing at S901 to S905 until it is determined that all the feature points in the second feature point shape data are selected at S905. In a case where it is determined that all the feature points in the second feature point shape data are selected at S905, the reliability determination unit 103 ends the processing of the flowchart shown in FIG. 9.

After S802, at S304, the second shape obtaining unit 104 determines whether or not there exists a feature point whose reliability is low, that is, determines whether or not there exists even one feature point whose reliability is less than or equal to a threshold value. In a case where it is determined that there exists not a single feature point whose reliability is low at S304, the information processing apparatus 100 ends the processing of the flowchart shown in FIG. 8. In a case where it is determined that there exists even one feature point whose reliability is low at S304, the second shape obtaining unit 104 generates and obtains object shape data at S305. After S305, at S306, the correction unit 105 corrects the feature point shape data (second feature point shape data). After S306, the information processing apparatus 100 ends the processing of the flowchart shown in FIG. 8.

According to the information processing apparatus 100 configured as above, it is possible to easily obtain more highly accurate three-dimensional shape data.

Embodiment 4

The information processing apparatus 100 according to Embodiment 1 determines the reliability of information indicating the spatial position of each feature point included in the feature point shape data based on the identification accuracy of the feature point in the captured image. Further, the information processing apparatus 100 according to Embodiment 2 determines the reliability of information indicating the spatial position of each feature point included in the feature point shape data based on the measurement accuracy of each of the plurality of points included in the point cloud. In contrast to this, the information processing apparatus 100 according to Embodiment 4 determines reliability based on the similarity between pixel values included in image areas corresponding to each other among a plurality of captured images in which a feature point is captured.

<Configuration of Information Processing Apparatus According to Embodiment 4>

The information processing apparatus 100 according to Embodiment 4 (in the following, simply referred to as "information processing apparatus 100") comprises the image obtaining unit 101, the first shape obtaining unit 102, the reliability determination unit 103, the second shape obtaining unit 104, and the correction unit 105 shown in FIG. 1. The processing of each unit comprised by the information processing apparatus 100 is performed by hardware, such as an ASIC or FPGA, incorporated in the information processing apparatus 100, or by software or the like using a memory, such as a RAM, and a processor, such as a CPU, shown as an example in FIG. 2.

Figure 10:
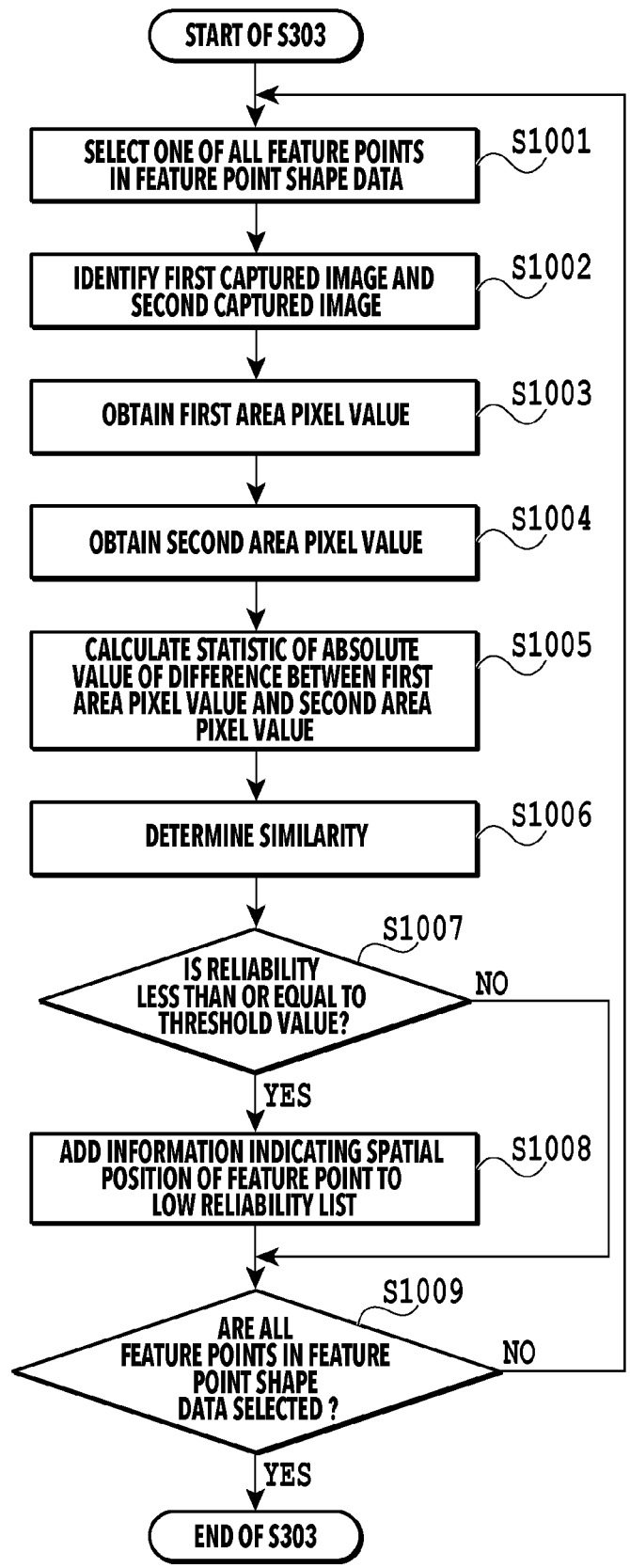
FIG. 10 is a flowchart showing an example of a processing flow of a reliability determination unit according to Embodiment 4.

With reference to FIG. 3 and FIG. 10, the operation of the information processing apparatus 100 is explained and at the same time, the processing of the reliability determination unit 103 according to Embodiment 4 (in the following, simply referred to as "reliability determination unit 103" is explained. The processing of the image obtaining unit 101, the first shape obtaining unit 102, the second shape obtaining unit 104, and the correction unit 105 according to Embodiment 4 is the same as that of the image obtaining unit 101, the first shape obtaining unit 102, the second shape obtaining unit 104, and the correction unit 105 according to Embodiment 1 or Embodiment 2, and therefore, explanation is omitted. In the following, explanation is give by referring to the image obtaining unit 101, the first shape obtaining unit 102, the second shape obtaining unit 104, and the correction unit 105 according to Embodiment 4 simply as "image obtaining unit 101", "first shape obtaining unit 102", "second shape obtaining unit 104", and "correction unit 105".

<Processing Flow of Information Processing Apparatus According to Embodiment 4>

First, the information processing apparatus 100 performs the processing at S301 and S302. After S302, at S303, the reliability determination unit 103 determines the reliability of information indicating the spatial position of each feature point included in the feature point shape data obtained at S302. With reference to FIG. 10, the processing at S303 according to Embodiment 4 is explained. FIG. 10 is a flowchart showing an example of a processing flow of the reliability determination unit 103 at the S303 according to Embodiment 4. The reliability determination unit 103 first, at S1001, selects one of all the feature points in the feature point shape data. Next, at S1002, the reliability determination unit 103 identifies at least two captured images in which the feature point selected at S1001 is captured from among multi-viewpoint images. In the following, explanation is given on the assumption that the reliability determination unit 103 identifies two captured images in which the selected feature point is captured at S1002 and one of the two captured images is referred to as a first captured image and the other is referred to as a second captured image.

Next, at S1003, the reliability determination unit 103 obtains two-dimensional coordinates in a case where three-dimensional coordinates that indicate the spatial position of the feature point selected at S1001 are projected onto the first captured image based on the camera parameters of the imaging apparatus having captured the first captured image. Further, the reliability determination unit 103 obtains the pixel value (in the following, referred to as "first area pixel value") of a plurality of pixels included in the image area, including the pixel corresponding to the two-dimensional coordinates in the obtained first captured image and having a size determined in advance. In the following, explanation is given on the assumption that the first area pixel value is the pixel value of eight pixels adjacent around the pixel corresponding to the two-dimensional coordinates in the obtained first captured image, but the first area pixel value is not limited to this. Next, at S1004, the reliability determination unit 103 obtains two-dimensional coordinates in a case where three-dimensional coordinates that indicate the spatial position of the feature point selected at S1001 are projected onto the second captured image based on the camera parameters of the imaging apparatus having captured the second captured image. Further, the reliability determination unit 103 obtains the pixel value (in the following, referred to as "second area pixel value") of a plurality of pixels included in the image area, including the pixel corresponding to the two-dimensional coordinates in the obtained second captured image and having a size determined in advance. In the following, explanation is given on the assumption that the second area pixel value is the pixel value of eight pixels adjacent around the pixel corresponding to the two-dimensional coordinates in the obtained second captured image, but the second area pixel value is not limited to this.

Next, at S1005, the reliability determination unit 103 calculates the absolute value of the difference between each pixel value in the first area pixel values obtained at S1003 and the corresponding pixel value among the second area pixel values obtained at S1004. Further, the reliability determination unit 103 calculates the statistics, such as the sum total of the absolute values of the differences, the average, or the median. Next, at S1006, the reliability determination unit 103 determines similarity based on the statistics calculated at S1005. Specifically, for example, the smaller the statistic, the higher the similarity is determined to be and the larger the statistic, the lower the similarity is determined to be. Next, at S1007, the reliability determination unit 103 determines whether or not the similarity, that is, the reliability is less than or equal to a threshold value determined in advance by using the similarity determined at S1006 as the reliability of the spatial position of the feature point selected at S1001. In a case where it is determined that the reliability is less than or equal to the threshold value at S1007, the reliability determination unit 103 adds information indicating the spatial position of the feature point to the low reliability list at S1008.

After S1008, or in a case where it is determined that the reliability is not less than or equal to the threshold value at S1007, the reliability determination unit 103 determines whether or not all the feature points in the feature point shape data are selected at S1009. In a case where it is determined that all the feature points in the feature point shape data are not selected at S1009, the processing returns to S1001 and the reliability determination unit 103 selects one feature point that has not been selected so far from among the plurality of feature points in the feature point shape data. The reliability determination unit 103 repeatedly performs the processing at S1001 to S1009 until it is determined that all the feature points in the feature point shape data are selected at S1009. In a case where it is determined that all the feature points in the feature point shape data are selected at S1009, the reliability determination unit 103 ends the processing of the flowchart shown in FIG. 10.

After S303, the information processing apparatus 100 performs the processing at S304 to S306 and ends the processing of the flowchart shown in FIG. 3.

According to the information processing apparatus 100 configured as above, it is possible to easily obtain more highly accurate three-dimensional shape data.

Embodiment 5

The information processing apparatus 100 according to Embodiment 4 determines the reliability based on the similarity between pixel values included in the image areas corresponding to each other among the plurality of captured images in which the feature point is captured. In contrast to this, the information processing apparatus 100 according to Embodiment 5 determines reliability based on the similarity between pixel values included in image areas corresponding to each other in the captured image and in the projected image obtained by projecting the captured image onto the shape of the object indicated by the feature point shape data.

<Configuration of Information Processing Apparatus According to Embodiment 5>

The information processing apparatus 100 according to Embodiment 5 (in the following, simply referred to as "information processing apparatus 100") comprises the image obtaining unit 101, the first shape obtaining unit 102, the reliability determination unit 103, the second shape obtaining unit 104, and the correction unit 105 shown in FIG. 1. The processing of each unit comprised by the information processing apparatus 100 is performed by hardware, such as an ASIC or FPGA, incorporated in the information processing apparatus 100, or by software or the like using a memory, such as a RAM, and a processor, such as a CPU, shown as an example in FIG. 2.

<Processing Flow of Information Processing Apparatus According to Embodiment 5>

Figure 11:
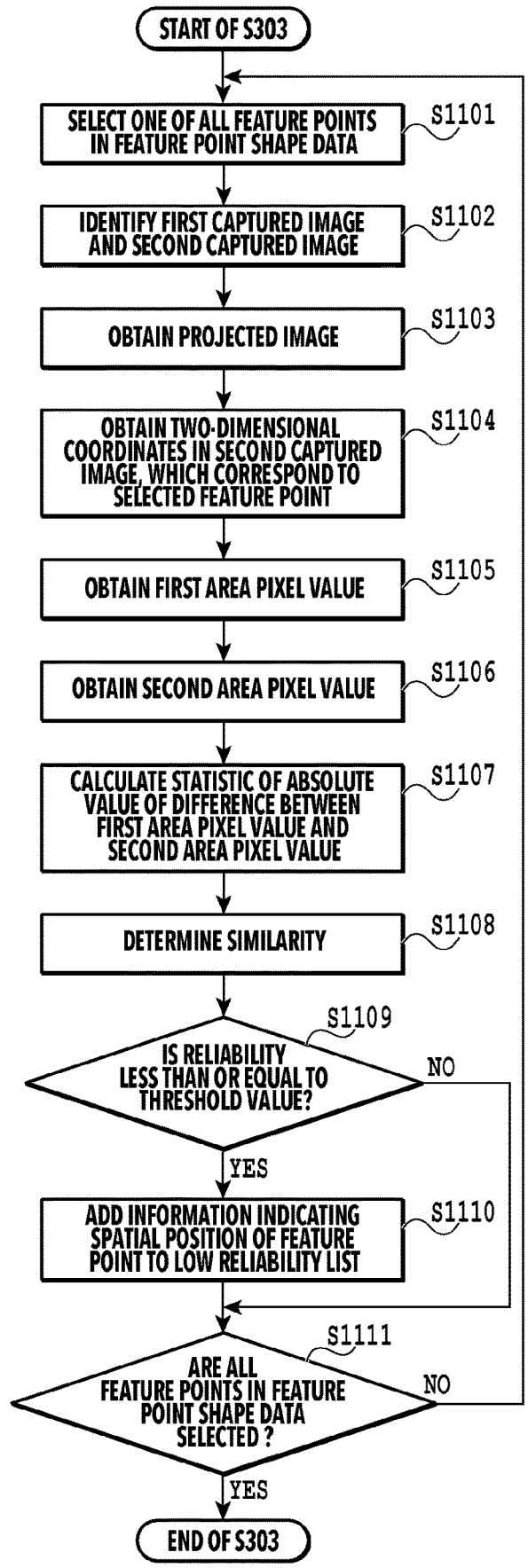
FIG. 11 is a flowchart showing an example of a processing flow of a reliability determination unit according to Embodiment 5.

With reference to FIG. 3 and FIG. 11, the operation of the information processing apparatus 100 is explained and at the same time, the processing of the reliability determination unit 103 according to Embodiment 5 (in the following, simply referred to as "reliability determination unit 103") is explained. The processing of the image obtaining unit 101, the first shape obtaining unit 102, the second shape obtaining unit 104, and the correction unit 105 according to Embodiment 5 is the same as that of the image obtaining unit 101, the first shape obtaining unit 102, the second shape obtaining unit 104, and the correction unit 105 according to Embodiment 1 or Embodiment 2, and therefore, explanation is omitted. In the following, explanation is given by referring to the image obtaining unit 101, the first shape obtaining unit 102, the second shape obtaining unit 104, and the correction unit 105 according to Embodiment 5 simply as "image obtaining unit 101", "first shape obtaining unit 102", "second shape obtaining unit 104", and "correction unit 105".

First, the information processing apparatus 100 performs the processing at S301 and S302. In the following, explanation is given on the assumption that the first shape obtaining unit 102 obtains, at S302, mesh data indicating the surface shape of an object, which consists of polygonal polygons, such as triangular polygons, whose vertexes being each of a plurality of feature points, as feature point shape data. After S302, at S303, the reliability determination unit 103 determines the reliability of information indicating the spatial position of each feature point included in the feature point shape data obtained at S302.

With reference to FIG. 11, the processing at S303 according to Embodiment 5 is explained. FIG. 11 is a flowchart showing an example of a processing flow of the reliability determination unit 103 at S303 according to Embodiment 5. First, at S1101, the reliability determination unit 103 selects one of all the feature points in the feature point shape data. Next, at S1102, the reliability determination unit 103 identifies at least two captured images in which the feature point selected at S1101 is captured from among multi-viewpoint images. In the following, explanation is given on the assumption that the reliability determination unit 103 identifies two captured images in which the selected feature point is captured at S1102 and one of the two captured images is referred to as a first captured image and the other is referred to as a second captured image. Here, it is desirable for the first captured image and the second captured image to be captured images captured by the first imaging apparatus having captured the first captured image and the second imaging apparatus having captured the second captured image, both imaging apparatuses being located at positions close to each other. Next, at S1103, the reliability determination unit 103 obtains the projected image obtained by projecting the first captured image onto the shape of the object indicated by the feature point shape data from the viewpoint of the second imaging apparatus (in the following, referred to as "second viewpoint") based on the camera parameters of the second imaging apparatus having captured the second captured image. Next, at S1104, the reliability determination unit 103 obtains the position in the second captured image corresponding to the feature point selected at S1101, which is the two-dimensional coordinates in the second captured image, as two-dimensional coordinates.

Next, at S1105, the reliability determination unit 103 identifies coordinates corresponding to the two-dimensional coordinates obtained at S1104 in the projected image obtained at S1103. Further, the reliability determination unit 103 obtains the pixel value (in the following, referred to as "first area pixel value") of a plurality of pixels included in the image area, including the pixel corresponding to the coordinates in the projected image and having a size determined in advance. In the following, explanation is given on the assumption that the first area pixel value is the pixel value of eight pixels adjacent around the pixel corresponding to the identified coordinates in the projected image, but the first area pixel value is not limited to this. Next, at S1106, the reliability determination unit 103 obtains the pixel value (in the following, referred to as "second area pixel value") of a plurality of pixels included in the image area, including the pixel corresponding to the two-dimensional coordinates obtained at S1104 and having a size determined in advance. In the following, explanation is given on the assumption that the second area pixel value is the pixel value of eight pixels adjacent around the pixel corresponding to the two-dimensional coordinates obtained at S1104 in the second captured image, but the second area pixel value is not limited to this.

Next, at S1107, the reliability determination unit 103 calculates the absolute value of the difference between each pixel value in the first area pixel values obtained at S1105 and the corresponding pixel value among the second area pixel values obtained at S1106. Further, the reliability determination unit 103 calculates the statistics, such as the sum total of the absolute values of the differences, the average, or the median. Next, at S1108, the reliability determination unit 103 determines similarity based on the statistics calculated at S1107. Specifically, for example, the smaller the statistic, the higher the similarity is determined to be and the larger the statistic, the lower the similarity is determined to be. Next, at S1109, the reliability determination unit 103 determines whether or not the similarity, that is, the reliability is less than or equal to a threshold value determined in advance by using the similarity determined at S1108 as the reliability of the spatial position of the feature point selected at S1101. In a case where it is determined that the reliability is less than or equal to the threshold value at S1109, the reliability determination unit 103 adds information indicating the spatial position of the feature point to the low reliability list at S1110.

After S1110, or in a case where it is determined that the reliability is not less than or equal to the threshold value at S1109, the reliability determination unit 103 determines whether or not all the feature points in the feature point shape data are selected at S1111. In a case where it is determined that all the feature points in the feature point shape data are not selected at S1111, the processing returns to S1101 and the reliability determination unit 103 selects one feature point that has not been selected so far from among the plurality of feature points in the feature point shape data. The reliability determination unit 103 repeatedly performs the processing at S1101 to S1111 until it is determined that all the feature points in the feature point shape data are selected at S1111. In a case where it is determined that all the feature points in the feature point shape data are selected at S1111, the reliability determination unit 103 ends the processing of the flowchart shown in FIG. 11. After S303, the information processing apparatus 100 performs the processing at S304 to S306 and ends the processing of the flowchart shown in FIG. 3.

According to the information processing apparatus 100 configured as above, it is possible to easily obtain more highly accurate three-dimensional shape data.

Embodiment 6

The information processing apparatus 100 according to Embodiment 1 to Embodiment 5 corrects the feature point shape data by using the object shape data based on the determination results of the reliability of the spatial position of each feature point in the feature point shape data. In contrast to this, the information processing apparatus 100 according to Embodiment 6 corrects feature point shape data by using object shape data based on the determination results of the reliability explained in Embodiment 1 to Embodiment 5 and determination results of reliability other than and different from the above-described reliability. In the following, explanation is given by referring to the reliability explained in Embodiment 1 to Embodiment 5 as first reliability and the other reliability different from the first reliability as second reliability.

<Configuration of Information Processing Apparatus According to Embodiment 6>

The information processing apparatus 100 according to Embodiment 6 (in the following, simply referred to as "information processing apparatus 100") comprises the image obtaining unit 101, the first shape obtaining unit 102, the reliability determination unit 103, the second shape obtaining unit 104, and the correction unit 105 shown in FIG. 1. The processing of each unit comprised by the information processing apparatus 100 is performed by hardware, such as an ASIC or FPGA, incorporated in the information processing apparatus 100, or by software or the like using a memory, such as a RAM, and a processor, such as a CPU, shown as an example in FIG. 2.

<Processing Flow of Information Processing Apparatus According to Embodiment 6>

With reference to FIG. 3 and FIG. 12 to FIG. 14, the operation of the information processing apparatus 100 is explained and at the same time, the processing of the reliability determination unit 103 and the correction unit 105 according to Embodiment 6 (in the following, simply referred to as "reliability determination unit 103" and "correction unit 105") is explained. The processing of the image obtaining unit 101, the first shape obtaining unit 102, and the second shape obtaining unit 104 according to Embodiment 6 is the same as that of the image obtaining unit 101, the first shape obtaining unit 102, and the second shape obtaining unit 104 according to Embodiment 1 or Embodiment 2, and therefore, explanation is omitted. In the following, explanation is given by referring to the image obtaining unit 101, the first shape obtaining unit 102, and the second shape obtaining unit 104 according to Embodiment 6 simply as "image obtaining unit 101", "first shape obtaining unit 102", and "second shape obtaining unit 104".

First, the information processing apparatus 100 performs the processing at S301 and S302. In the following, explanation is given on the assumption that the first shape obtaining unit 102 obtains, at S302, mesh data indicating the surface shape of an object, which consists of polygonal polygons, such as triangular polygons, whose vertexes being each of a plurality of feature points, as feature point shape data. After S302, at S303, the reliability determination unit 103 determines the reliability of information indicating the spatial position of each feature point included in the feature point shape data obtained at S302 based on the first reliability and the second reliability.

Figure 12:
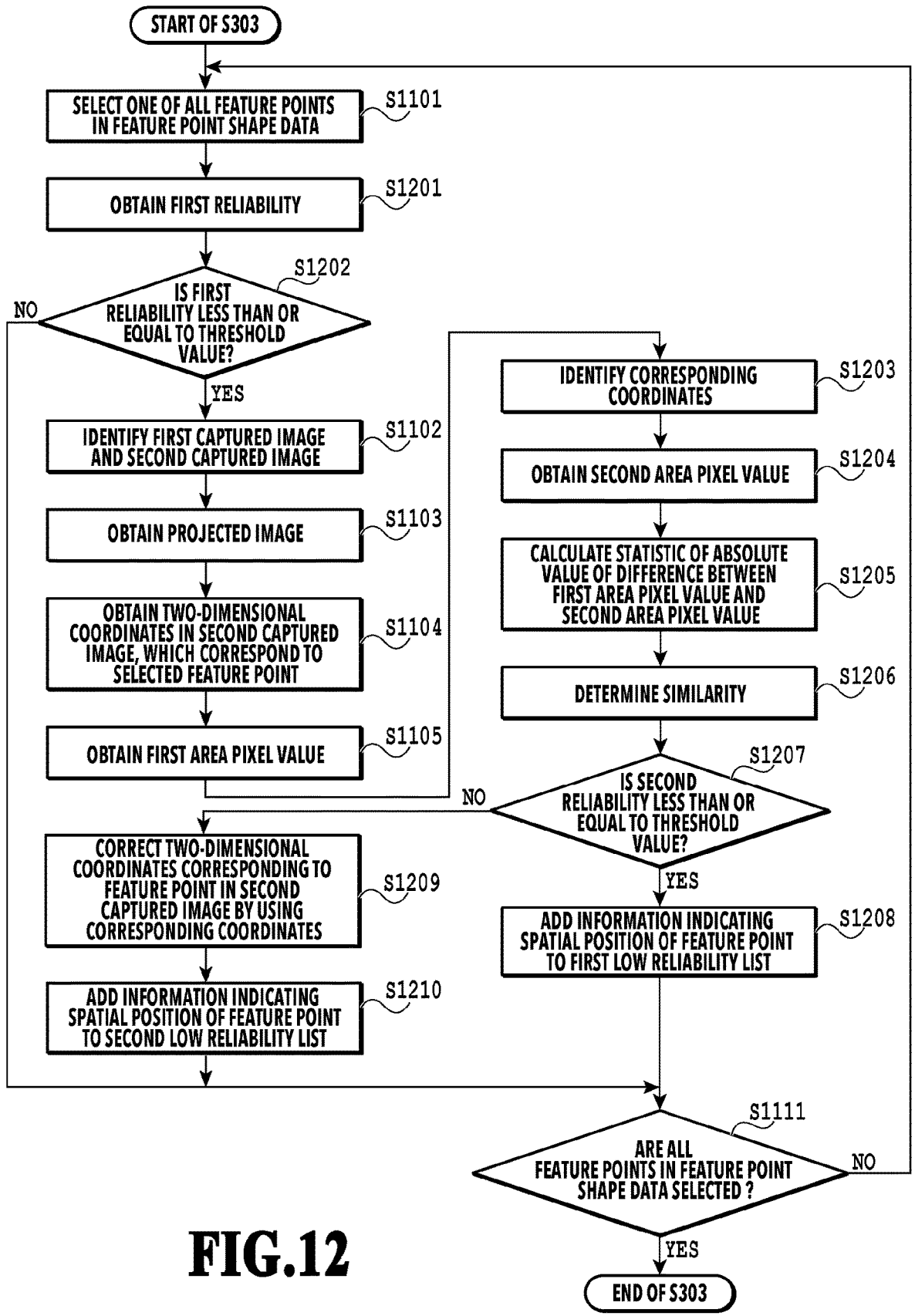
FIG. 12 is a flowchart showing an example of a processing flow of a reliability determination unit according to Embodiment 6.

With reference to FIG. 12, the processing at S303 according to Embodiment 6 is explained. FIG. 12 is a flowchart showing an example of a processing flow of the reliability determination unit 103 at S303 according to Embodiment 6. In FIG. 12, to the same processing as that in FIG. 11, the same symbol is attached and explanation thereof is omitted. The reliability determination unit 103 first performs the processing at S1101. Next, at S1201, the reliability determination unit 103 obtains the reliability of the spatial position of the feature point selected at S1101, which is the reliability explained in Embodiment 1 to Embodiment 5, as the first reliability. Next, at S1202, the reliability determination unit 103 determines whether or not the first reliability obtained at S1201 is less than or equal to a threshold value determined in advance. In a case where it is determined that the first reliability is less than or equal to the threshold value at S1202, the reliability determination unit 103 performs the processing at S1102 to S1105. In a case where the reliability determination unit 103 performs the processing at S1102 to S1105 in the flowchart shown in FIG. 11 at the time of obtaining the first reliability at S1201, it may be possible to omit the processing at S1102 to S1105 in the flowchart shown in FIG. 12.

After S1105, at S1203, the reliability determination unit 103 identifies the two-dimensional coordinates (in the following, referred to as "corresponding coordinates") corresponding to the two-dimensional coordinates obtained at S1104 in the projected image obtained at S1103, from the second captured image. The identification method of corresponding coordinates in the second captured image will be described later with reference to FIG. 13. Next, at S1204, the reliability determination unit 103 obtains the pixel value (in the following, referred to as "second area pixel value") of a plurality of pixels included in the image area, including the pixel corresponding to the corresponding coordinates identified at S1203 and having a size determined in advance. In the following, explanation is given on the assumption that the second area pixel value is the pixel value of eight pixels adjacent around the pixel corresponding to the identified coordinates in the projected image, but the second area pixel value is not limited to this. Next, at S1205, the reliability determination unit 103 calculates the absolute value of the difference between each pixel value in the first area pixel values obtained at S1105 and the corresponding pixel value among the second area pixel values obtained at S1204. Further, the reliability determination unit 103 calculates the statistics, such as the sum total of the absolute values of the differences, the average, or the median. Next, at S1206, the reliability determination unit 103 determines similarity based on the statistics calculated at S1205. Specifically, for example, the smaller the statistic, the higher the similarity is determined to be and the larger the statistic, the lower the similarity is determined to be.

Next, at S1207, the reliability determination unit 103 determines whether or not the similarity, that is, the second reliability is less than or equal to a threshold value determined in advance by using the similarity determined at S1206 as the second reliability of the spatial position of the feature point selected at S1101. In a case where it is determined that the second reliability is less than or equal to the threshold value at S1207, the reliability determination unit 103 adds information indicating the spatial position of the feature point selected at S1101 to a first low reliability list at S1208. In a case where it is determined that the second reliability is not less than or equal to the threshold value at S1207, the reliability determination unit 103 modifies, at S1209, the two-dimensional coordinates corresponding to the feature point selected at S1201 in the second captured image obtained at S1104 by using the corresponding coordinates identified at S1204. Next, at S1210, the reliability determination unit 103 adds information indicating the spatial position of the feature point selected at S1101 to a second low reliability list.

After S1208 or S1210, or in a case where it is determined that the first reliability is not less than or equal to the threshold value at S1202, the reliability determination unit 103 performs the processing at S1111. In a case where it is determined that all the feature points in the feature point shape data are not selected at S1111, the processing returns to S1101 and the reliability determination unit 103 selects one feature point that has not been selected so far from among the plurality of feature points in the feature point shape data. The reliability determination unit 103 repeatedly performs the processing at S1101 to S1111 until it is determined that all the feature points in the feature point shape data are selected at S1111. In a case where it is determined that all the feature points in the feature point shape data are selected at S1111, the reliability determination unit 103 ends the processing of the flowchart shown in FIG. 12.

Figure 13:
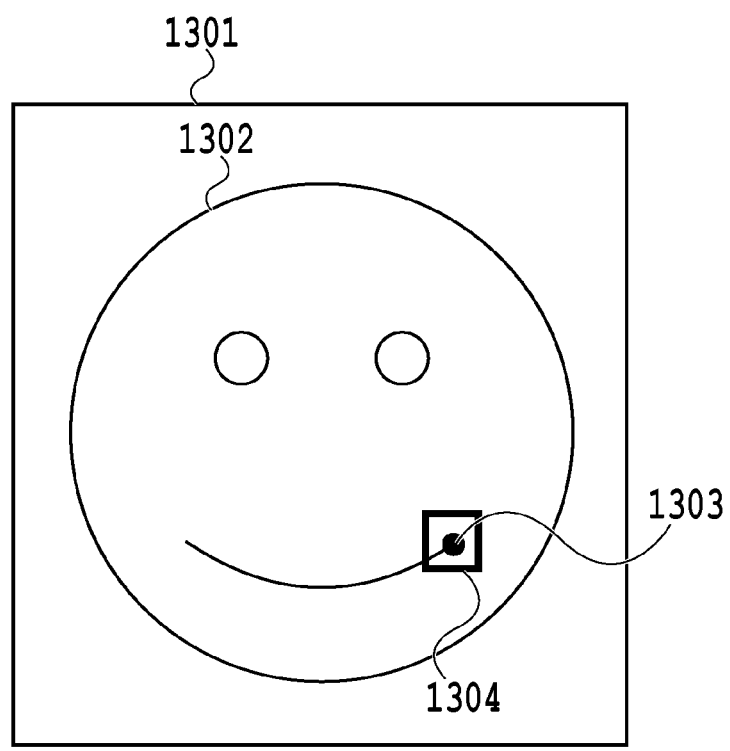
FIG. 13 is a diagram showing an example of an image obtained by projecting a first captured image onto the shape of an object indicated by feature point shape data from a second viewpoint according to Embodiment 6.

With reference to FIG. 13, the identification method of corresponding coordinates in the second captured image is explained. FIG. 13 is a diagram showing an example of an image 1301 after rendering, which is obtained in a case where the first captured image projected onto the shape of the object indicated by the feature point shape data from the second viewpoint is viewed from the second viewpoint. In FIG. 13, an image area 1302 corresponding to the object captured in the first captured image (in the present embodiment, the face of a natural person) and a feature point 1303 corresponding to the left end of the lip are shown. The reliability determination unit 103 first obtains the image corresponding to an image area 1304 having a size determined in advance with the feature point 1303 being taken as a center, which is indicated by a solid-line rectangle in the image area 1302 corresponding to the object (face), as a template image.

Next, the reliability determination unit 103 searches for and identifies an image area similar to the template image from the second captured image by template matching or the like. Specifically, for example, in the second captured image, the reliability determination unit 103 sets the image area as a search range, which has a size determined in advance with the position corresponding to the position of the feature point 1303 in the image 1301 being taken as a center. Further, the reliability determination unit 103 searches for an image area similar to the template image within the set search range and identifies an image area similar to the template image from the second captured image. Furthermore, the reliability determination unit 103 takes the position of the center of the identified image area as the position of the feature point in the second captured image, which corresponds to the feature point 1303. In a case of multi-viewpoint images, it may happen sometimes that the resolution of a captured image corresponding to each viewpoint is different from that of another. In the case such as this, it is also possible to make a comparison by taking the average as the similarity, which is obtained by dividing the sum total of the absolute values of differences between each pixel value in the first area pixel values and the corresponding pixel value among the second area pixel values by the number of pixels of the image area 1304 or the like, but this is not limited.

After S303, at S304, the second shape obtaining unit 104 determines whether or not there exists a feature point whose reliability is low, that is, whether or not there exists even one feature point at least whose first reliability is less than or equal to the threshold value. In a case where it is determined that there exists not a single feature point whose reliability is low at S304, the information processing apparatus 100 ends the processing of the flowchart shown in FIG. 3. In a case where it is determined that there exists even one feature point whose reliability is low at S304, the second shape obtaining unit 104 generates and obtains object shape data at S305. After S305, at S306, the correction unit 105 corrects the feature point shape data. After S306, the information processing apparatus 100 ends the processing of the flowchart shown in FIG. 3.

Figure 14:
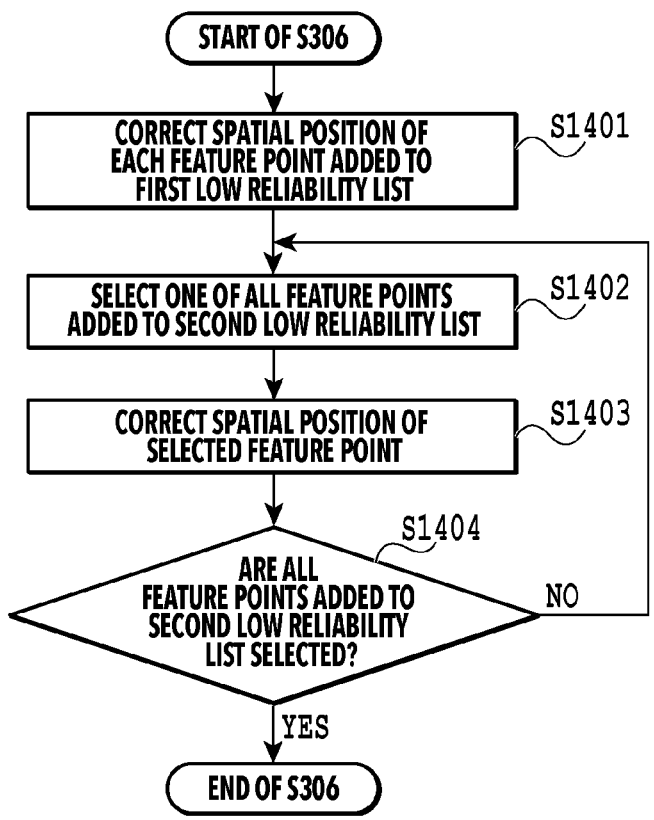
FIG. 14 is a flowchart showing an example of a processing flow of a correction unit according to Embodiment 6.

With reference to FIG. 14, the processing at S306 according to Embodiment 6 is explained. FIG. 14 is a flowchart showing an example of a processing flow of the correction unit 105 at S306 according to Embodiment 6. The correction unit 105 first, at S1401, corrects the spatial position of each feature point added to the first low reliability list at S1208 by the correction method explained in Embodiment 1 or Embodiment 2, that is, by the correction method explained by using FIG. 5B or FIG. 7. Next, at S1402, the correction unit 105 selects one of all the feature points added to the second low reliability list at S1210.

Next, at S1403, the correction unit 105 corrects the spatial position of the feature point selected at S1402 by using the two-dimensional coordinates corresponding to the feature point selected at S1402 in the second captured image after being modified to the corresponding coordinates at S1209 and the camera parameters of the second imaging apparatus. Specifically, for example, by the method explained by using FIG. 4A, the correction unit 105 obtains the spatial position of the feature point and corrects the spatial position of the feature point selected at S1402 to the obtained spatial position of the feature point. Next, at S1404, the correction unit 105 determines whether or not all the feature points added to the second low reliability list are selected. In a case where it is determined that all the feature points added to the second low reliability list are not selected at S1404, the processing returns to S1402 and the correction unit 105 selects one feature point that has not been selected so far from among all the feature points added to the second low reliability list. The correction unit 105 repeatedly performs the processing at S1402 to S1404 until it is determined that all the feature points added to the second low reliability list are selected at S1404. In a case where it is determined that all the feature points added to the second reliability list are selected at S1404, the correction unit 105 ends the processing of the flowchart shown in FIG. 14.

According to the information processing apparatus 100 configured as above, it is possible to easily obtain highly accurate three-dimensional shape data.

Embodiment 7

The information processing apparatus 100 according to Embodiment 1 to Embodiment 6 corrects the spatial position of the feature point whose reliability is low by using the object shape data based on the reliability of the spatial position of each feature point in the feature point shape data. In contrast to this, the information processing apparatus 100 according to Embodiment 7 (in the following, simply referred to as "information processing apparatus 100") modifies object shape data based on corrected feature point shape data.

<Configuration of Information Processing Apparatus According to Embodiment 7>

Figure 15:
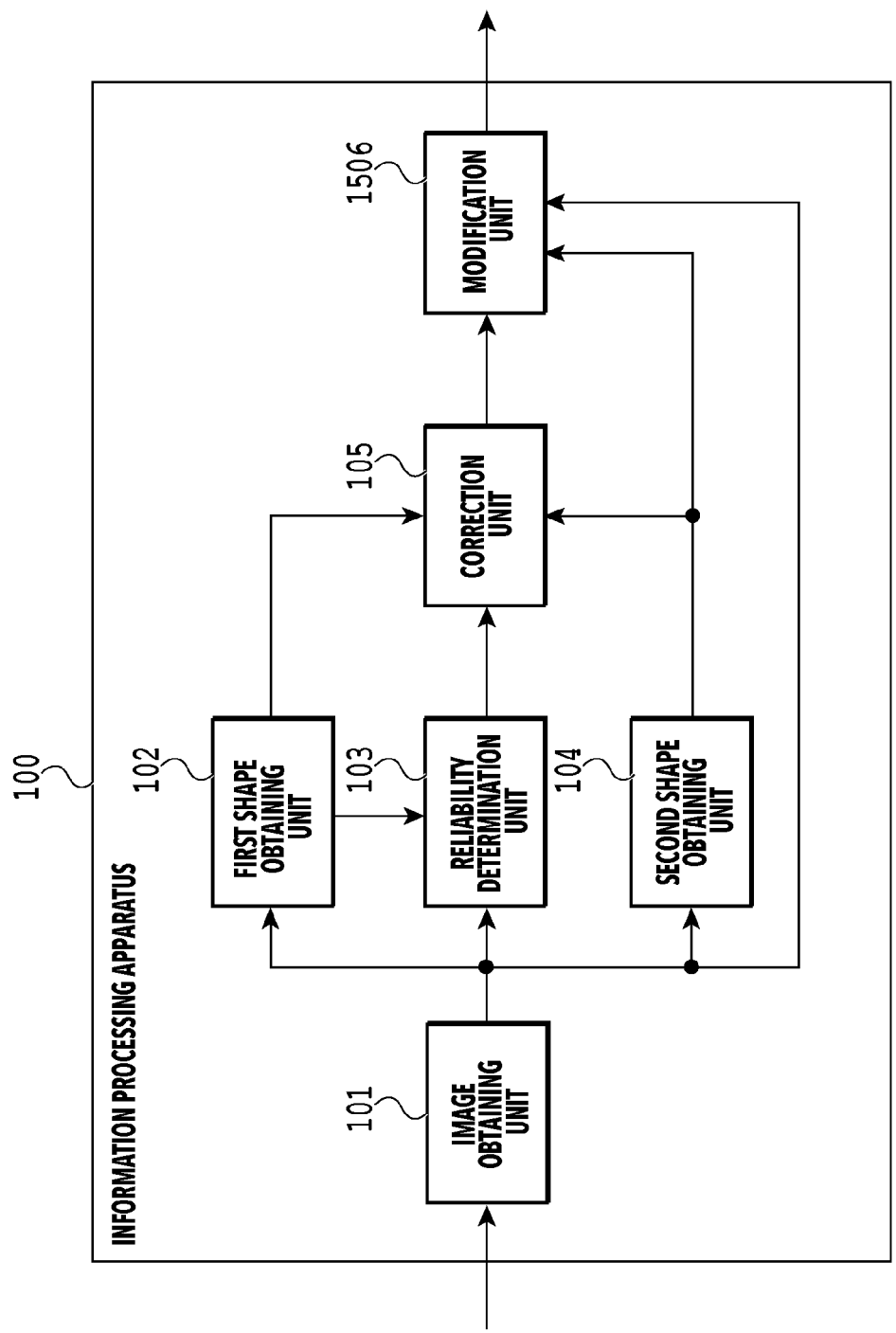
FIG. 15 is a block diagram showing an example of a configuration of a function block of an information processing apparatus according to Embodiment 7.

With reference to FIG. 15, the configuration of the information processing apparatus 100 is explained. FIG. 15 is a block diagram showing an example of the configuration of the function block of the information processing apparatus 100 according to Embodiment 7. The information processing apparatus 100 comprises the image obtaining unit 101, the first shape obtaining unit 102, the reliability determination unit 103, the second shape obtaining unit 104, the correction unit 105, and a modification unit 1506. The processing of each unit comprised by the information processing apparatus 100 is performed by hardware, such as an ASIC or FPGA, incorporated in the information processing apparatus 100, or by software or the like using a memory, such as a RAM, and a processor, such as a CPU, shown as an example in FIG. 2.

<Processing Flow of Information Processing Apparatus According to Embodiment 7>

Figure 16:
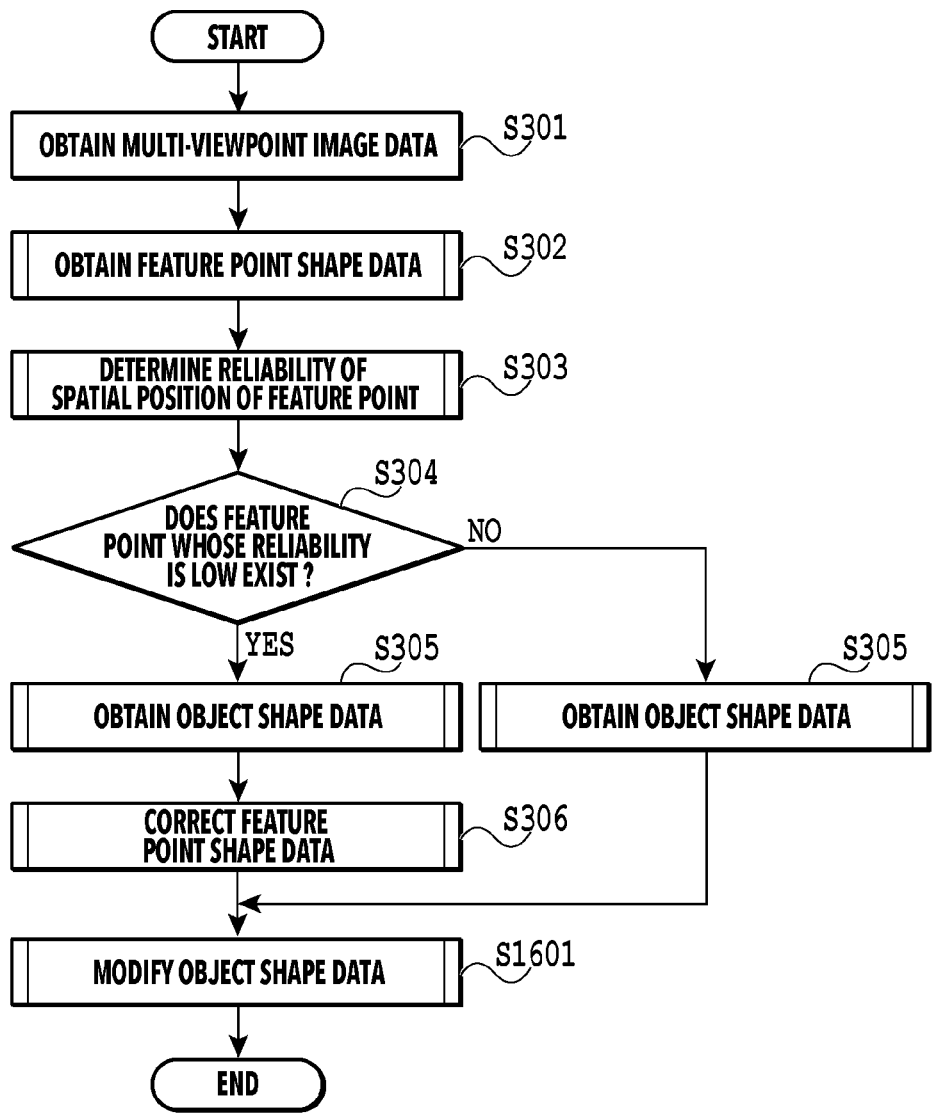
FIG. 16 is a flowchart showing an example of a processing flow of the information processing apparatus according to Embodiment 7.
Figure 17:
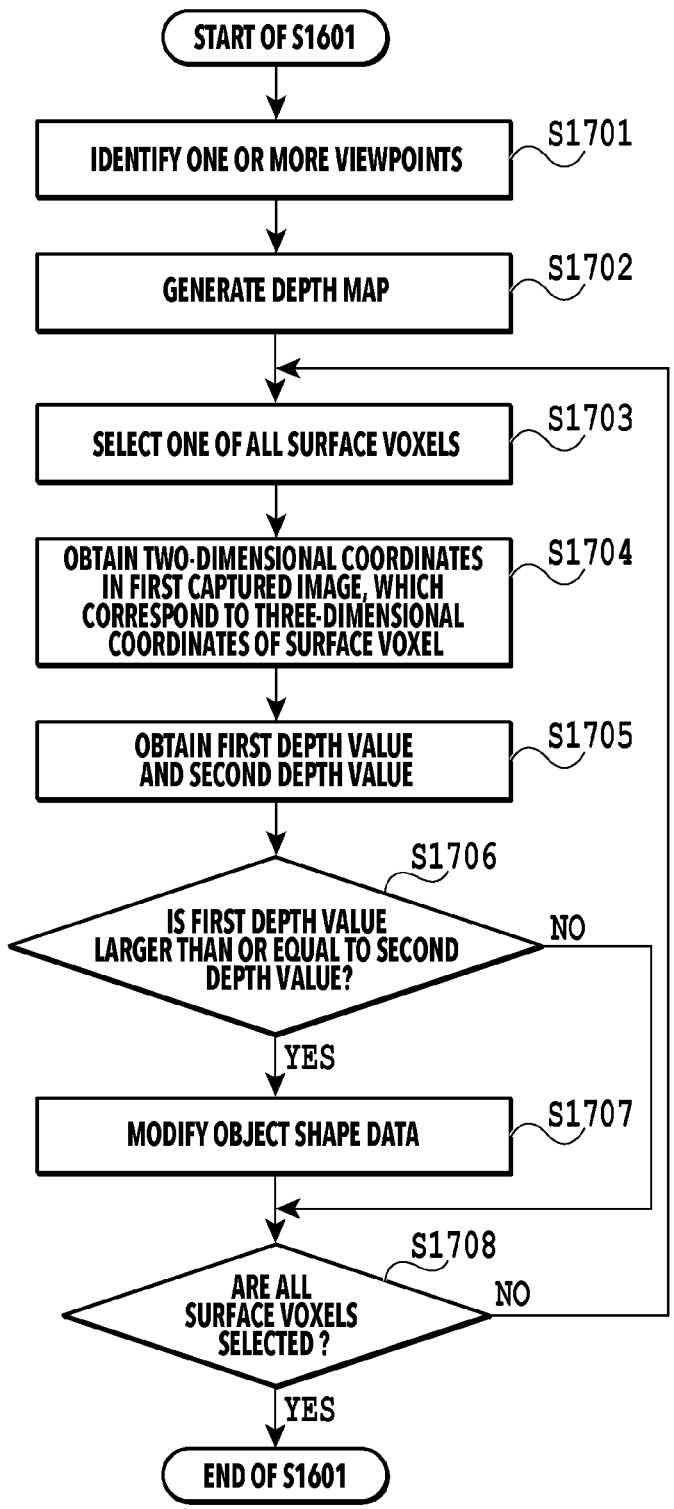
FIG. 17 is a flowchart showing an example of a processing flow of a modification unit according to Embodiment 7.

With reference to FIG. 16 and FIG. 17, the operation of the information processing apparatus 100 is explained and at the same time, the processing of the modification unit 1506 is explained. The image obtaining unit 101, the first shape obtaining unit 102, the reliability determination unit 103, the second shape obtaining unit 104, and the correction unit 105 according to Embodiment 7 are the same as each unit shown in FIG. 1 explained in Embodiment 1 to Embodiment 6, and therefore, the same symbol is attached thereto and explanation thereof is omitted. FIG. 16 is flowchart showing an example of a processing flow of the information processing apparatus 100 according to Embodiment 7. In FIG. 16, to the same processing as that in FIG. 3, the same symbol is attached and explanation thereof is omitted.

First, the information processing apparatus 100 performs the processing at S301 to S306. It is assumed that the information processing apparatus 100 performs the processing at S305 even in a case where it is determined that there exists not a single feature point whose reliability is low at S304. Further, in the following, explanation is given on the assumption that the first shape obtaining unit 102 obtains, at S302, mesh data indicating the surface shape of an object, which consists of polygonal polygons, such as triangular polygons, whose vertexes being each of a plurality of feature points, as feature point shape data. Furthermore, explanation is given on the assumption that the second shape obtaining unit 104 obtains, at S305, voxel data as object shape data, in which the point corresponding to the object is indicated by the ON voxel and each of the other points is indicated by the OFF voxel.

After S306, at S1601, the modification unit 1506 modifies the object shape data obtained at S305 by using the feature point shape data after being corrected at S306. Before the modification of the object shape data at S1601, it may be possible to increase the number of feature points in the corrected feature point shape data by tesselating the corrected feature point shape data. By tesselating the corrected feature point shape data before the modification of the object shape data, it is possible to make smooth the shape of the object indicated by the modified object shape data. Similarly, it may also be possible to tesselate uncorrected feature point shape data before the processing at S1601 after S305 in a case where it is determined that there exists not a single feature point whose reliability is low at S304. After S1601, the information processing apparatus 100 ends the processing of the flowchart shown in FIG. 16.

With reference to FIG. 17, the processing of the modification unit 1506 at S1601 is explained. FIG. 17 is a flowchart showing an example of a processing flow of the modification unit 1506 according to Embodiment 7. The modification unit 1506 first, at S1701, identifies one or more viewpoints from which the captured image is captured, in which at least one of the plurality of feature points in the corrected feature point shape data is captured. Next, at S1702, the modification unit 1506 generates a depth map in a case where the point corresponding to the surface of the object in the object shape data is viewed from each identified viewpoint based on the camera parameters of the imaging apparatus corresponding to each viewpoint identified at S1701 and the object shape data obtained at S305. Specifically, the modification unit 1506 generates a depth map in a case where the point corresponding to the surface of the object in the object shape data is viewed from each viewpoint based on the camera parameters of the imaging apparatus corresponding to each viewpoint and the spatial position of the voxel corresponding to the surface (in the following, referred to as "surface voxel") of the object in the object shape data. In the following, explanation is given on the assumption that the surface voxel is the ON voxel adjacent to the OFF voxel.

Further, in the following, as an example, explanation is given on the assumption that two viewpoints (in the following, referred to as "first viewpoint" and "second viewpoint") are identified at S1701. Further, in the following, explanation is given by referring to the depth map corresponding to the first viewpoint as a first depth map and the depth map corresponding to the second viewpoint as a second depth map. Further, explanation is given by referring to the camera parameters of the imaging apparatus corresponding to the first viewpoint as first camera parameters and the camera parameters of the imaging apparatus corresponding to the second viewpoint as second camera parameters. Further, explanation is given by referring to the captured image captured by the imaging apparatus corresponding to the first viewpoint as a first captured image and the captured image captured by the imaging apparatus corresponding to the second viewpoint as a second captured image.

Next, at S1703, the modification unit 1506 selects one of all the surface voxels in the object shape data. Next, at S1704, the modification unit 1506 projects three-dimensional coordinates indicating the spatial position of the surface voxel, such as the center position of the surface voxel selected at S1703, onto the first captured image by using the first camera parameters. By the projection, the modification unit 1506 obtains two-dimensional coordinates in the first captured image, which correspond to the three-dimensional coordinates of the surface voxel. Next, at S1705, the modification unit 1506 obtains the depth value (in the following, referred to as "first depth value") of the pixel corresponding to the two-dimensional coordinates obtained at S1704 in the first depth map obtained at S1702. Further, the modification unit 1506 obtains the depth value (in the following, referred to as "second depth value") of the pixel corresponding to the two-dimensional coordinates obtained at S1704 in the second depth map obtained at S1702. Next, at S1706, the modification unit 1506 determines whether or not the first depth value is larger than or equal to the second depth value. In a case where it is determined that the first depth value is larger than or equal to the second depth value at S1706, the modification unit 1506 modifies the object shape data by changing the surface voxel selected at S1703 to the OFF voxel at S1707.

After S1707, or in a case where it is determined that the first depth value is not larger than or equal to the second depth value at S1706, the modification unit 1506 determines whether or not all the surface voxels in the object shape data are selected at S1708. In a case where it is determined that all the surface voxels are not selected at S1708, the processing returns to S1703 and the modification unit 1506 selects one surface voxel that has not been selected so far from among all the surface voxels in the object shape data. The modification unit 1506 repeatedly performs the processing at S1703 to S1708 until it is determined that all the surface voxels are selected at S1708. In a case where it is determined that all the surface voxels are selected at S1708, the modification unit 1506 ends the processing of the flowchart shown in FIG. 17.

The object shape data that is obtained by the second shape obtaining unit 104 is generated by using the silhouette image corresponding to each captured image in the multi-viewpoint images. Because of this, there is a case where the shape of the object indicated by the object shape data is such that in which the concave region in the object, such as the cavity between the nose and the cheek of the face of a natural person, is swelled out compared to the shape of the actual object. According to the information processing apparatus 100 configured as above, it is possible to modify the shape corresponding to the above-described concave region in the object shape data to the shape closer to the shape of the actual object.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each embodiment described above is explained on the assumption that the first shape obtaining unit 102 obtains in advance the feature point shape data before correction (change) and the correction unit 105 corrects (changes) the feature point shape data obtained in advance by the first shape obtaining unit 102, but explanation is not limited to this. For example, it may also be possible for the first shape obtaining unit 102 to obtain the feature point shape data based on the reliability of the spatial position of each of the plurality of feature points and the object shape data. Further, for example, it may also be possible for the first shape obtaining unit 102 to have a function to correct (change) the spatial position of the feature point, which corresponds to the function of the correction unit 105, and generate and obtain the feature point shape data while correcting (changing) the spatial position of the feature point. In the case such as this, it is not necessary for the information processing apparatus 100 according to each embodiment to have the correction unit 105.

According to the present disclosure, it is possible to easily obtain highly accurate three-dimensional shape data.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-004943, filed Jan. 17, 2022 which is hereby incorporated by reference wherein in its entirety.

What is claimed is:

1. An information processing apparatus comprising:
one or more hardware processors; and
one or more memories storing one or more programs configured to be executed by the one or more hardware processors, the one or more programs including instructions for:
obtaining data of a plurality of captured images obtained by capturing an object from a plurality of viewpoints;
obtaining first three-dimensional shape data indicating a shape of the object, which includes information indicating a spatial position of each of a plurality of feature points indicating features of the object;
obtaining second three-dimensional shape data indicating the shape of the object by using the captured image;
changing information indicating the spatial position of the feature point included in the first three-dimensional shape data obtained in advance and before being changed based on a first reliability, which is a reliability, and on a second reliability different from the first reliability; and
identifying, at a time of obtaining changed first three-dimensional shape data, in a case where similarity between a pixel value of a first image area including a pixel corresponding to the feature point whose first reliability is lower than a first threshold value that is a threshold value, which is the feature point corresponding to the feature point identified in a second captured image that is the captured image obtained by image capturing from a second viewpoint, in a projected image obtained by projecting a first captured image that is the captured image obtained by image capturing from a first viewpoint among the plurality of viewpoints onto the shape of the object indicated by the first three-dimensional shape data before being changed from the second viewpoint among the plurality of viewpoints, which is different from the first viewpoint, and a pixel value of a second image area corresponding to the first image area, which is the second image area in the second captured image that is the captured image obtained by image capturing from the second viewpoint, is lower than a reference value, a new spatial position corresponding to the spatial position of the feature point in the first three-dimensional shape data before being changed from among spatial positions corresponding to a surface of the object in the second three-dimensional shape data by assuming that the second reliability of the spatial position of the feature point in the first three-dimensional shape data before being changed is lower than a second threshold value; wherein the first three-dimensional shape data is corrected based on reliability of the spatial position of each of the plurality of feature points and the second three-dimensional shape data, wherein the first three-dimensional shape data is corrected by changing the spatial position of the feature point whose reliability is lower than a threshold value based on the second three-dimensional shape data, wherein the spatial position of the feature point in the first three-dimensional shape data before being changed is changed by using the new spatial position, and wherein the spatial position of the surface of the object in the second three-dimensional shape data, which corresponds to the feature point whose first reliability is lower than the first threshold value and corresponds to the feature point in the first three-dimensional shape data, whose second reliability is higher than the second threshold value, is changed.

2. The information processing apparatus according to claim 1, wherein the one or more programs further include an instruction for:

identifying, in the captured image, a position of the feature point captured in the captured image; wherein the spatial position of the feature point is identified based on the position of the feature point in the captured image.

3. The information processing apparatus according to claim 2, wherein the spatial position of the feature point is changed by assuming the reliability of the spatial position of the feature point corresponding to the feature point whose identification accuracy of the position of the feature point captured in the captured image is lower than a reference value to be lower than the threshold value.

4. The information processing apparatus according to claim 1, wherein the one or more programs further include an instruction for:

obtaining data of a point cloud, which is measurement results by a measuring device measuring a three-dimensional shape of the object; wherein each of a plurality of points included in the point cloud is taken to be the feature point.

5. The information processing apparatus according to claim 4, wherein the spatial position of the feature point is changed by using measurement data indicating measurement accuracy of each of the plurality of points included in the point cloud, which is measurement results by the measuring device, and assuming the reliability of the spatial position of the feature point whose measurement accuracy is lower than a reference value to be lower than the threshold value.

6. The information processing apparatus according to claim 1, wherein in a case where similarity between a pixel value of an image area including a pixel corresponding to a first feature point in a first captured image, which is the feature point identified in the first captured image that is the captured image obtained by image capturing from a first viewpoint among the plurality of viewpoints, and a pixel value of an image area including a pixel corresponding to a second feature point in a second captured image, which is the feature point corresponding to the first feature point and identified in the second captured image that is the captured image obtained by image capturing from a second viewpoint among the plurality of viewpoints, which is different from the first viewpoint, is lower than a reference value, the spatial position of the feature point is changed by assuming that the reliability of the spatial position of the feature point corresponding to the first feature point and the second feature point is lower than the threshold value.

7. The information processing apparatus according to claim 1, wherein in a case where similarity between a first pixel value of an image area including a pixel corresponding to the feature point in a second captured image, which is identified in the second captured image that is the captured image obtained by image capturing from a second viewpoint, in a projected image obtained by projecting a first captured image that is the captured image obtained by image capturing from a first viewpoint among the plurality of viewpoints onto the shape of the object indicated by the first three-dimensional shape data from the second viewpoint among the plurality of viewpoints, whose position is close to the first viewpoint, and a second pixel value of an image area including a pixel corresponding to the feature point in the second captured image, which is identified in the second captured image, is lower than a reference value, the spatial position of the feature point is changed by assuming that the reliability of the spatial position of the feature point in the first three-dimensional shape data, which corresponds to the feature point identified in the second captured image, is lower than the threshold value.

8. The information processing apparatus according to claim 1, wherein the one or more programs further include an instruction for:

identifying the new spatial position corresponding to the spatial position of the feature point whose reliability is lower than the threshold value in the first three-dimensional shape data from among spatial positions corresponding to the surface of the object in the second three-dimensional shape data; wherein the spatial position of the feature point whose reliability is lower than the threshold value is changed by using the new spatial position.

9. The information processing apparatus according to claim 1, wherein the one or more programs further include an instruction for:

adding one or more interpolation points that interpolate between the feature points as the feature points; wherein at the time of obtaining the first three-dimensional shape data including information indicating the spatial position of the feature point and information indicating the spatial position of the interpolation point added as the feature point, the first three-dimensional shape data is obtained in which the spatial position of the feature point corresponding to the interpolation point is changed by assuming that the reliability of the spatial position of the interpolation point added as the feature point is lower than the threshold value.

10. The information processing apparatus according to claim 1, wherein
the spatial position of the surface of the object in the second three-dimensional shape data, which corresponds to the feature point, is calculated and changed by assuming that a position of the feature point in the second captured image, which corresponds to the feature point in the first three-dimensional shape data, whose first reliability is lower than the first threshold value and whose second reliability is higher than the second threshold value, and is identified in the second captured image, is a position in the second captured image, which corresponds to a position corresponding to the feature point in the projected image.

11. The information processing apparatus according to claim 1, wherein
the one or more programs further include instructions for:
generating a silhouette image indicating an image area in which the object is captured in the captured image by using the captured image; and
generating and obtaining the second three-dimensional shape data by applying a visual hull method to the generated silhouette image.

12. The information processing apparatus according to claim 1, wherein
the one or more programs further include an instruction for:
modifying the second three-dimensional shape data based on the first three-dimensional shape data; wherein
the second three-dimensional shape data is modified by modifying the spatial position of the surface of the object in the second three-dimensional shape data, which corresponds to the feature point, by using the spatial position of the feature point in the first three-dimensional shape data.

13. An information processing method comprising the steps of:
obtaining data of a plurality of captured images obtained by capturing an object from a plurality of viewpoints;
obtaining first three-dimensional shape data indicating a shape of the object, which includes information indicating a spatial position of each of a plurality of feature points indicating features of the object;
obtaining second three-dimensional shape data indicating the shape of the object by using the captured image;
changing information indicating the spatial position of the feature point included in the first three-dimensional shape data obtained in advance and before being changed based on a first reliability, which is a reliability, and on a second reliability different from the first reliability; and
identifying, at a time of obtaining changed first three-dimensional shape data, in a case where similarity between a pixel value of a first image area including a pixel corresponding to the feature point whose first reliability is lower than a first threshold value that is a threshold value, which is the feature point corresponding to the feature point identified in a second captured image that is the captured image obtained by image capturing from a second viewpoint, in a projected image obtained by projecting a first captured image that is the captured image obtained by image capturing from a first viewpoint among the plurality of viewpoints onto the shape of the object indicated by the first three-dimensional shape data before being changed from the second viewpoint among the plurality of viewpoints, which is different from the first viewpoint, and a pixel value of a second image area corresponding to the first image area, which is the second image area in the second captured image that is the captured image obtained by image capturing from the second viewpoint, is lower than a reference value, a new spatial position corresponding to the spatial position of the feature point in the first three-dimensional shape data before being changed from among spatial positions corresponding to a surface of the object in the second three-dimensional shape data by assuming that the second reliability of the spatial position of the feature point in the first three-dimensional shape data before being changed is lower than a second threshold value; wherein
the first three-dimensional shape data is corrected based on reliability of the spatial position of each of the plurality of feature points and the second three-dimensional shape data, wherein
the first three-dimensional shape data is corrected by changing the spatial position of the feature point whose reliability is lower than a threshold value based on the second three-dimensional shape data, wherein
the spatial position of the feature point in the first three-dimensional shape data before being changed is changed by using the new spatial position, and wherein
the spatial position of the surface of the object in the second three-dimensional shape data, which corresponds to the feature point whose first reliability is lower than the first threshold value and corresponds to the feature point in the first three-dimensional shape data, whose second reliability is higher than the second threshold value, is changed.

14. A non-transitory computer readable storage medium storing a program for causing a computer to perform a control method of an information processing apparatus, the control method comprising the steps of:
obtaining data of a plurality of captured images obtained by capturing an object from a plurality of viewpoints;
obtaining first three-dimensional shape data indicating a shape of the object, which includes information indicating a spatial position of each of a plurality of feature points indicating features of the object;
obtaining second three-dimensional shape data indicating the shape of the object by using the captured image;
changing information indicating the spatial position of the feature point included in the first three-dimensional shape data obtained in advance and before being changed based on a first reliability, which is a reliability, and on a second reliability different from the first reliability; and
identifying, at a time of obtaining changed first three-dimensional shape data, in a case where similarity between a pixel value of a first image area including a pixel corresponding to the feature point whose first reliability is lower than a first threshold value that is a threshold value, which is the feature point corresponding to the feature point identified in a second captured image that is the captured image obtained by image capturing from a second viewpoint, in a projected image obtained by projecting a first captured image that is the captured image obtained by image capturing from a first viewpoint among the plurality of viewpoints onto the shape of the object indicated by the first three-dimensional shape data before being changed from the second viewpoint among the plurality of viewpoints, which is different from the first viewpoint, and a pixel value of a second image area corresponding to the first image area, which is the second image area in the second captured image that is the captured image obtained by image capturing from the second viewpoint, is lower than a reference value, a new spatial position corresponding to the spatial position of the feature point in the first three-dimensional shape data before being changed from among spatial positions corresponding to a surface of the object in the second three-dimensional shape data by assuming that the second reliability of the spatial position of the feature point in the first three-dimensional shape data before being changed is lower than a second threshold value; wherein the first three-dimensional shape data is corrected based on reliability of the spatial position of each of the plurality of feature points and the second three-dimensional shape data, wherein the first three-dimensional shape data is corrected by changing the spatial position of the feature point whose reliability is lower than a threshold value based on the second three-dimensional shape data, wherein the spatial position of the feature point in the first three-dimensional shape data before being changed is changed by using the new spatial position, and wherein the spatial position of the surface of the object in the second three-dimensional shape data, which corresponds to the feature point whose first reliability is lower than the first threshold value and corresponds to the feature point in the first three-dimensional shape data, whose second reliability is higher than the second threshold value, is changed.

* * * * *